(12) United States Patent
Tagami et al.

(10) Patent No.: US 11,745,481 B2
(45) Date of Patent: Sep. 5, 2023

(54) MULTILAYER FILM, LAMINATED BODY, AND AIR BAG

(71) Applicant: ZF Automotive Germany GmbH, Alfdorf (DE)

(72) Inventors: Toru Tagami, Osaka (JP); Yosuke Yamada, Osaka (JP); Kaito Yamamoto, Osaka (JP); Michael Ludwig, Raubling (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/756,851

(22) PCT Filed: Dec. 3, 2020

(86) PCT No.: PCT/JP2020/045129
§ 371 (c)(1),
(2) Date: Jun. 3, 2022

(87) PCT Pub. No.: WO2021/112202
PCT Pub. Date: Jun. 10, 2021

(65) Prior Publication Data
US 2023/0020420 A1    Jan. 19, 2023

(30) Foreign Application Priority Data
Dec. 6, 2019   (JP) ................... 2019-221659

(51) Int. Cl.
*B32B 27/12*    (2006.01)
*B32B 1/00*    (2006.01)
(Continued)

(52) U.S. Cl.
CPC ............... *B32B 27/12* (2013.01); *B32B 1/00* (2013.01); *B32B 5/02* (2013.01); *B32B 7/12* (2013.01);
(Continued)

(58) Field of Classification Search
CPC .. B32B 27/12; B32B 1/00; B32B 5/02; B32B 7/12; B32B 27/08; B32B 27/285;
(Continued)

(56) References Cited

U.S. PATENT DOCUMENTS

2003/0059606 A1    3/2003  Iijima et al.
2004/0006182 A1*   1/2004  Omori ................ C08J 5/18
                                                525/193

(Continued)

FOREIGN PATENT DOCUMENTS

JP    H09-221588    8/1997
JP    2001-200038    7/2001
(Continued)

OTHER PUBLICATIONS

International Search Report dated Feb. 9, 2021 with respect to No. PCT/JP2020/045129.

*Primary Examiner* — Michael C Miggins
(74) *Attorney, Agent, or Firm* — IPUSA, PLLC

(57) ABSTRACT

A multilayer film bonded to a base fabric includes a first layer bonded to the base fabric; and a second layer disposed on the first layer. The first layer, the second layer, or both includes a thermoplastic elastomer. The thermoplastic elastomer is at least one selected from the group consisting of a polyester-based elastomer, a polyurethane-based elastomer, and a polyamide-based elastomer. A melt strength of the multilayer film is greater than or equal to 7.5 mN.

10 Claims, 8 Drawing Sheets

(51) Int. Cl.
  *B32B 5/02*    (2006.01)
  *B32B 7/12*    (2006.01)
  *B32B 27/08*   (2006.01)
  *B32B 27/28*   (2006.01)
  *B32B 27/30*   (2006.01)
  *B32B 27/32*   (2006.01)
  *B32B 27/36*   (2006.01)
  *C09J 129/04*  (2006.01)
  *C09J 167/02*  (2006.01)
  *C09J 171/00*  (2006.01)

(52) U.S. Cl.
  CPC ............ *B32B 27/08* (2013.01); *B32B 27/285* (2013.01); *B32B 27/306* (2013.01); *B32B 27/32* (2013.01); *B32B 27/36* (2013.01); *C09J 129/04* (2013.01); *C09J 167/02* (2013.01); *C09J 171/00* (2013.01); *B32B 2250/24* (2013.01); *B32B 2270/00* (2013.01); *B32B 2274/00* (2013.01); *B32B 2571/00* (2013.01); *B32B 2605/003* (2013.01)

(58) Field of Classification Search
  CPC ....... B32B 27/306; B32B 27/32; B32B 27/36; B32B 2250/24; B32B 2270/00; B32B 2274/00; B32B 2571/00; B32B 2605/003; C09J 129/04; C09J 167/02; C09J 171/00
  See application file for complete search history.

(56) References Cited

U.S. PATENT DOCUMENTS

| | | |
|---|---|---|
| 2020/0114630 A1 | 4/2020 | Yamada et al. |
| 2020/0114631 A1 | 4/2020 | Yamada et al. |
| 2020/0122441 A1 | 4/2020 | Yamada et al. |
| 2020/0223389 A1 | 7/2020 | Yamada et al. |

FOREIGN PATENT DOCUMENTS

| | | |
|---|---|---|
| JP | 2002-144486 | 5/2002 |
| JP | 2003-026755 | 1/2003 |
| JP | 2005-089483 | 4/2005 |
| JP | 2005-169651 | 6/2005 |
| JP | 2012-030547 | 2/2012 |
| JP | 2016-081705 | 5/2016 |
| WO | 2018/230721 | 12/2018 |
| WO | 2018/230722 | 12/2018 |
| WO | 2018/230723 | 12/2018 |
| WO | 2018/230724 | 12/2018 |

* cited by examiner

MULTILAYER FILM, LAMINATED BODY, AND AIR BAG

TECHNICAL FIELD

The present invention relates to a multilayer film, a laminated body, and an air bag.

BACKGROUND ART

A multilayer film is generally configured by laminating a plurality of resin layers, and is widely used in an article with a change in shape, such as a vehicular airbag, an outdoor product, or a packaging, due to its excellent flexibility. Such an article may be provided with a base fabric whose shape is subject to change. In order to protect the base fabric, a multilayer film with a resin layer having adhesion to the base fabric is used on the surface of the base fabric.

As the above-described multilayer film, for example, a laminated molded body configured by laminating an adhesive polymer composition layer made of a modified polyester-based elastomer and a gas barrier resin layer made of a polyamide-based resin or an ethylene-vinyl alcohol copolymer is disclosed (See, for example, Patent document 1).

The laminated molded body is made by melting respectively an adhesive polymer composition and a thermoplastic resin, which are molding materials for layers configuring the laminated molded body, and using various molding methods such as an extrusion molding method (coextrusion molding method), an inflation molding method, a blow molding method, a rotary molding method, or an injection molding method.

CITATION LIST

Patent Literature

PTL 1: Japanese Unexamined Patent Application Publication No. 2002-144486

SUMMARY OF INVENTION

Problem to be Solved by the Invention

However, in the multilayer film disclosed in Patent Document 1, the molding stability at molding film is poor, and the film may not be molded into a desired shape. For example, when a T-die method is used, a so-called neck-in phenomenon may occur in which a melt resin extruded from a T-die becomes narrow. When the inflation molding method is used, the melt resin may not be uniformly blown up, and a stable bubble may not be formed.

An aspect of the present invention aims at providing a multilayer film capable of having excellent molding stability.

Means for Solving the Problem

According to an aspect of the present invention, a multilayer film bonded to a base fabric includes a first layer bonded to the base fabric; and a second layer disposed on the first layer, the first layer, the second layer, or both including a thermoplastic elastomer, the thermoplastic elastomer being at least one selected from the group consisting of a polyester-based elastomer, a polyurethane-based elastomer, and a polyamide-based elastomer, and a melt strength being greater than or equal to 7.5 mN.

Effects of the Invention

According to the aspect of the present invention, a multilayer film can have excellent molding stability.

MODE FOR CARRYING OUT THE INVENTION

Figure 1:
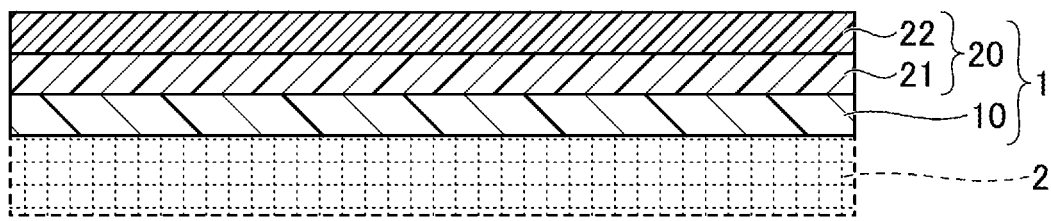
FIG. 1 is a cross-sectional view schematically illustrating a multilayer film according to an embodiment of the present invention.
Figure 1:
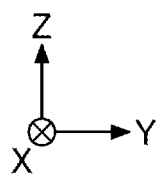

Hereinafter, an embodiment of the present invention will be described in detail. In order to facilitate understanding of the description, the same component in the drawings will be denoted by the same reference numeral, and overlapping descriptions will be omitted. The scale of each member in the drawings may be different from the actual scale. In the specification, a hyphen "-" means to include values given before and after a numerical range as a lower limit and an upper limit, unless otherwise indicated.

<Multilayer Film>

A multilayer film according to an embodiment of the present invention will be described. FIG. 1 is a schematic cross-sectional view of the multilayer film according to the present embodiment. As shown in FIG. 1, the multilayer film 1 includes an adhesive layer 10, which is a first layer, and a second layer 20, which is bonded to (joined with) the adhesive layer 10; and is formed by stacking the second layer 20 on the adhesive layer 10. The multilayer film 1 may be used in adhesion to a fibrous article, such as a base fabric 2. Details of the base fabric 2 will be described later.

In FIG. 1, a three-dimensional orthogonal coordinate system in three axis directions (an X-axis direction, a Y-axis direction, and a Z-axis direction) is used, and coordinates in a main plane of the first layer are in the X-axis direction and the Y-axis direction, and a height direction (in a thickness direction) is in the Z-axis direction. A direction from a bottom to a top of the first layer (the direction from the main surface of the first layer to the second layer) is in the +Z-axis direction, and its opposite direction is in the −Z-axis direction. In the following description, for convenience of explanation, the +Z-axis side may be referred to as an upper side or upper, and the −Z-axis side may be referred to as a lower side or lower, but it does not represent a universal vertical relationship.

The multilayer film 1A contains a thermoplastic elastomer in any one of layers constituting the multilayer film 1 (the adhesive layer 10 and the second layer 20) and has a melt strength of 7.5 mN or more. The melt strength of the multilayer film 1A is preferably 8.0 mN or more, more preferably 9.0 mN or more, even more preferably 10 mN or more, and the most preferably 20.0 mN or more. If the melt strength is 7.5 mN or more, the multilayer film 1A can stably have a shape in a melt state that can be stretched during molding when various molding methods are used, such as the inflation method and the T-die method.

If the melt strength of the multilayer film 1A is as high as 7.5 mN or more, it is possible to advantageously deposit the multilayer film 1A. If the thermoplastic elastomer contained in the layer constituting the multilayer film 1A (the adhesive layer 10 and the second layer 20) has a high molecular weight or a branched structure, the melt strength of the multilayer film 1A can be increased. In addition, since the thermoplastic elastomer has heteroatoms, the thermoplastic elastomer can have a Coulomb force interaction in addition to the Van Der Waals force, so the melt strength of the multilayer film 1A can be increased.

The weight average molecular weight (Mw) of the thermoplastic elastomer is preferably 10,000 or more, more preferably 30,000 or more, and even more preferably 50,000 or more.

In the present embodiment, a melt resin is extruded from a prescribed die at a predetermined temperature and a predetermined extrusion speed and is drawn in a spin-like manner while gradually pulling the melt resin from a predetermined pulling speed, and the melt strength is a value obtained using a prescribed apparatus when the spin breaks. In the present embodiment, a resin, which is extruded from a capillary having a diameter of 1 mm, a length of 10 mm, and an entry angle of 180° where a piston descending speed is a constant speed of 8.8 rum/min, is drawn in a spin-like manner while gradually pulling the resin from a pulling speed of 5 m/min, and the melt strength is a value obtained using Capillary Extrusion Rheometer by Malvern Instruments Limited when the spin breaks.

The melt strength is measured at a temperature on the high side relative to the melting point of the adhesive layer 10 and the second layer 20 configuring the multilayer film 1A. This is because the layer configuring the multilayer film 1A does not melt at a temperature below the melting point, and is completely fluidized at a temperature that greatly exceeds the melting point to the high temperature side, and melt strength cannot be measured. The melting point of each layer (the adhesive layer 10 and the second layer 20) configuring the multilayer film 1A is a melting peak temperature measured by a differential scanning calorimeter.

Respective layers configuring the multilayer film 1A will be described.

[Adhesive Layer]

The adhesive layer 10 is a layer that adheres to the base fabric 2, and has an adhesion function when the multilayer film 1 is bonded to the base fabric 2. The adhesive layer 10 can be bonded to the base fabric 2 under a predetermined condition when the multilayer film 1 is bonded to the base fabric 2. Since the adhesive layer 10 develops the adhesion function, the multilayer film 1 can be bonded to the base fabric 2 well without using an adhesive agent or the like separately. Therefore, when the multilayer film 1 is bonded to the base fabric 2, it is possible to reduce the labor and cost due to use of an adhesive agent. In addition, when the multilayer film 1 is used for a long period of time, it is possible to prevent the multilayer film 1 from peeling away from the base fabric 2 due to deterioration of the adhesive agent.

The predetermined condition can be any one under which the adhesive layer 10 can develop an adhesion function to the base fabric 2, for example, by raising at least one of temperature and pressure so that the adhesive layer 10 can be softened or melted.

The adhesive layer 10 may have a function (hereinafter, also referred to as "airtight function") that prevents gas from flowing between inside and outside the layer. Because the adhesive layer 10 develops the airtight function, when the multilayer film 1 is bonded to the base fabric 2, it is possible to suppress leakage of gas such as air from the inside of the base fabric 2 to the outside.

The adhesive layer 10 may contain a thermoplastic elastomer, an ethylene-vinyl alcohol-based copolymer (EVOH), a polyolefin-based resin, a polyester-based resin, a polyamide-based resin, an acrylic resin, a polyurethane, a polyvinyl chloride, a polycarbonate, or the like (hereinafter, simply referred to as a thermoplastic elastomer or the like). One of the resins may be used alone, or two or more types of resins may be used in combination. Among them, the adhesive layer 10 preferably contains a thermoplastic elastomer and EVOH.

(Thermoplastic Elastomer)

The thermoplastic elastomer is preferably a block copolymer including a hard segment (also referred to as a high melting point segment or a crystalline segment) and a soft segment (also referred to as a low melting point segment or an amorphous segment). The thermoplastic elastomer is softened by heat to exhibit fluidity, and can have rubber-like elasticity in the absence of heat.

The thermoplastic elastomer includes at least one selected from the group consisting of a polyester-based elastomer (also referred to as a polyester-based thermoplastic elastomer), a polyurethane-based elastomer (also referred to as a polyurethane-based thermoplastic elastomer), and a polyamide-based elastomer (also referred to as a polyamide-based thermoplastic elastomer). Among them, the polyester-based elastomer is preferable, because a block copolymer having a branched structure is easily formed.

By including at least one or more of a polyester-based elastomer, a polyurethane-based elastomer, and a polyamide-based elastomer, the adhesive layer 10 can enhance the adhesion between the adhesive layer 10 of the resulting multilayer film 1 and the base fabric 2 and the adhesion between the adhesive layer 10 and the second layer 20, even under a condition that includes at least one of normal temperature, high temperature, and high humidity. Further, it is possible to improve the flexibility and mechanical strength of the multilayer film 1. A magnitude of the adhesion can be evaluated by a peel test, and the adhesion is determined to be high when a fracture occurs inside the film, such as an interlayer exfoliation, a cohesion failure and the like.

In the present embodiment, a high temperature means a temperature exceeding a normal temperature, and a high humidity means a humidity exceeding a normal humidity. The normal temperature refers to a temperature range of 5° C.-35° C., and the normal humidity refers to a relative humidity range of 45%-85%.

The polyester-based elastomer is preferably a polyester-polyether copolymer containing an aromatic polyester or the like as the hard segment, and an aliphatic polyether or the like as the soft segment; a polyester-polyester copolymer containing an aromatic polyester or the like as the hard segment, and an aliphatic polyester or the like as the soft segment; or the like.

The hard segment of the polyester-based elastomer preferably contains an aromatic polyester, for example, a polyester formed by an aromatic dicarboxylic acid and a diol.

Suitable aromatic polycarboxylic acids include, for example, phthalic acid, terephthalic acid, isophthalic acid, 2,6-naphthalene dicarboxylic acid, 2,7-naphthalene dicarboxylic acid, anthracene dicarboxylic acid, 4,4'-biphenyldicarboxylic acid, diphenoxyethane dicarboxylic acid, 4,4'-diphenyl ether dicarboxylic acid, 5-sulfoisophthalic acid, and sodium 3-sulfoisophthalate. One of the above-described aromatic polycarboxylic acids may be contained in the aromatic polyester alone, or two or more types may be contained in combination. Alternatively, a portion of the aromatic dicarboxylic acid may be replaced by an alicyclic or aliphatic carboxylic acid.

Suitable diols include, for example, aliphatic diols such as 1,4-butanediol, ethylene glycol, polypropylene glycol, trimethylene glycol, pentamethylene glycol, hexamethylene glycol, neopentyl glycol, and decamethylene glycol; alicyclic diols such as 1,1-cyclohexane dimethanol, 1,4-dicyclohexane dimethanol, and tricyclodecanedimethanol; and aromatic diols such as xylylene glycol, bis(p-hydroxy)diphenyl, bis(p-hydroxy)diphenyl, bis(p-hydroxy)diphenyl propane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quaterphenyl. One of the diols may be contained included in the aromatic polyester alone, or two or more types of diols may be contained in combination.

The polyester contained in the hard segment is preferably polybutylene terephthalate, polypropylene terephthalate, polybutylene isophthalate, polyethylene terephthalate, polyethylene isophthalate, or polytrimethylene terephthalate from the point of view of a heat resistance and a gas barrier property. One of the polyesters may be contained alone, or two or more types of the polyesters may be contained in combination. They may also be contained as copolymers or as mixtures.

The soft segment of the polyester-based elastomer preferably contains at least one of an aliphatic polyether and an aliphatic polyester. Suitable aliphatic polyether includes, for example, poly(ethylene oxide)glycol, poly(propylene oxide) glycol, poly(tetramethylene oxide) glycol (polytetramethylene ether glycol), poly(hexamethylene oxide) glycol, copolymer of ethylene oxide and propylene oxide, ethylene oxide addition polymer of poly(propylene oxide) glycol, and copolymer glycol of ethylene oxide and tetrahydrofuran. Suitable aliphatic polyesters include, for example, poly(ε-caprolactone), polyenantholactone, polycaprolactone, polybutylene adipate, and polyethylene adipate.

Among the above-described aliphatic polyethers and aliphatic polyesters, poly(tetramethylene oxide) glycol, ethylene oxide addition polymer of poly(propylene oxide) glycol, copolymer glycol of ethylene oxide and tetrahydrofuran, poly(ε-caprolactone), polybutylene adipate, polyethylene adipate, and the like are preferred from the viewpoint of elasticity and formability. Among them, poly(tetramethylene oxide) glycol, ethylene oxide addition polymer of poly(propylene oxide) glycol, and copolymer glycol of ethylene oxide and tetrahydrofuran, are particularly preferred.

The number average molecular weight of the soft segments is preferably about 300-6000 in the copolymerized state.

The polyester-based elastomer described above may be modified with an unsaturated carboxylic acid, such as acrylic acid, maleic acid, fumaric acid, or its derivative, in the presence of a radical generating agent. Preferably, the unsaturated carboxylic acid or its derivative added for modification is 0.1-30 parts by weight with respect to 100 parts by weight of the thermoplastic polyester-based elastomer. The type and amount of the component used for the modification may be selected depending on the material or application of the base fabric 2 to be bonded.

The content of the hard segment in the polyester-based elastomer in the adhesive layer 10 is preferably 10 wt %-70 wt % with respect to 100 wt % of the thermoplastic polyester-based elastomer, more preferably 20 wt %-60 wt %, and even more preferably 25 wt %-55 wt %. If the hard segment content is within the above-described preferred range, the mechanical strength, heat resistance, and durability of the multilayer film 1 under high temperature and high humidity can be improved, and adequate elasticity, flexibility, and formability of the multilayer film 1 can be ensured.

The content of the soft segment in the polyester-based elastomer in the adhesive layer 10 is preferably 30 wt %-90 wt % with respect to 100 wt % of the polyester-based elastomer, more preferably 40 wt %-80 wt %, and even more preferably 45 wt %-75 wt %. If the content of the soft segment is within the above-described preferred range, the proper elasticity, flexibility, and formability of the multilayer film 1 can be ensured, and the mechanical strength of the multilayer film 1 can be improved.

The content of the soft segment in the polyester-based elastomer is related to the melting point and the softening point of the polyester-based elastomer. In general, the higher the content of the soft segment in the polyester-based elastomer, the lower the melting point and the softening point of the polyester-based elastomer. The melting point of the polyester-based elastomer can be adjusted by adjusting the content of the soft segment in the polyester-based elastomer in the adhesive layer 10, so that the melting point of the adhesive layer 10 can be adjusted.

Preferably, the melting point of the adhesive layer 10 is adjusted accordingly and is lower than the melting point of the intermediate layer 21 and the airtight layer 22. The melting point of the adhesive layer 10 may be below the melting point of the intermediate layer 21 and the airtight layer 22 configuring the second layer 20, preferably 80° C.-250° C., more preferably 100° C.-200° C., and even more preferably 130° C.-190° C. The melting point of the adhesive layer 10 is adjusted according to the type and the content of the polyester-based elastomer used for the adhesive layer 10, the type and the content of the hard segment and the soft segment configuring the polyester-based elastomer, and the like.

When the melting point of the adhesive layer 10 is lower than the melting point of the intermediate layer 21 and the airtight layer 22, in the case where the multilayer film 1 is heated to adhere to the base fabric 2, the adhesive layer 10 can be softened or melted to a softness suitable for adhering to the base fabric 2 while suppressing softening of the intermediate layer 21 and the airtight layer 22. Therefore, even if the condition of the heating temperature or the pressure of the multilayer film 1 varies during manufacturing, secure adhesion to the base fabric 2 becomes possible.

Commercial products of polyester-based elastomers include Hytrel (trademark registered) by DU PONT-TORAY Co., Ltd.; MODIC (trademark registered), by Mitsubishi Chemical Co., Ltd.; Pelprene (trademark registered) by TOYOBO Co., Ltd.; Arnitel (trademark registered) by DSM Co., Ltd.; and Flexmer by Nihon Gosei Kako Co., Ltd.

The polyurethane-based elastomer is preferably a polyurethane-based copolymer including urethane or the like which is a condensation of a diisocyanate compound and a short-chain glycol as the hard segment, and polyester or polyether as the soft segment. The polyurethane-based elastomer may contain urethane alone or may contain two or more kinds of materials as the hard segment.

The polyurethane-based copolymer includes, for example, a copolymer expressed by Formula (I):

[Chem 1]

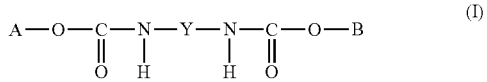

(where A is a condensation block of diisocyanate compound with short-chain glycol which is the hard segment, B is polyester or polyether which is the soft segment, and Y is a residue of the diisocyanate compound.)

As the diisocyanate compound, a known and conventional product, such as phenylene diisocyanate, tolylene diisocyanate, xylene diisocyanate, 4,4'-diphenylmethane diisocyanate, hexamethylene diisocyanate, and the like, is used. The diisocyanate compounds of the hard segment and of the soft segment may be the same or may be different.

The short chain glycols include alkylene glycols having 2-5 carbon atoms such as ethylene glycol, propylene glycol, and 1,4-butanediol.

The polyesters include polyalkylene adipate, polycaprolactone, polycarbonate, and the like.

The polyethers include poly(alkylene oxide) glycol having a molecular weight of 400-6000. The poly(alkylene oxide) glycols having a molecular weight of 400-6000 include polyethylene glycol, poly(1,2- and 1,3-propylene oxide) glycol, poly(tetramethylene oxide) glycol, poly(hexamethylene oxide) glycol, and the like.

The polyester and the polyether may contain a condensation bond portion with the diisocyanate compound.

For the soft segment of the polyurethane-based elastomer, the same material as the soft segment of the thermoplastic polyester-based elastomer described above can be used. Accordingly, a description of the soft segment of the polyurethane-based elastomer will be omitted.

The content of the hard segment in the polyurethane-based elastomer can be the same as the content, of the hard segment in the polyester-based elastomer described above. Accordingly, an explanation of the content of the hard segment in the polyester-based elastomer will be omitted.

The content of the soft segment in the polyurethane-based elastomer can be the same as the content of the soft segment in the polyester-based elastomer described above. Therefore, an explanation of the content of the soft segment in the polyester-based elastomer will be omitted.

The melting point of the polyurethane-based elastomer can be the same as the melting point of the polyester-based elastomer described above. Accordingly, the explanation of the melting point of the polyester-based elastomer will be omitted.

Commercial products of polyurethane-based elastomers include "Elastollan (trademark registered)" (by BASF Japan Ltd.), "Miractran" (by Nippon Miractran Co., Ltd.), "Resamine P series" (by Dainichiseika Color & Chemicals Mfg. Co., Ltd.), "U-FINE P" (by AGC Inc.), and the like.

The polyamide-based elastomer is preferably a polyamide copolymer or the like including polyamide as the hard segment, and polyether or polyester as the soft segment. The polyamide-based elastomer may include a polyamide alone, as the hard segment, or may include two or more kinds of materials.

The polyamide blocks include nylon 6, nylon 6,6, nylon 11, and nylon 12. Among them, nylon 12 is preferred.

The polyether block is preferably an aliphatic polyether block, similar to the soft segment of the polyester-based elastomer.

Polyamide-polyether copolymer includes, for example, a copolymer expressed by Formula (II):

{Chem 2]

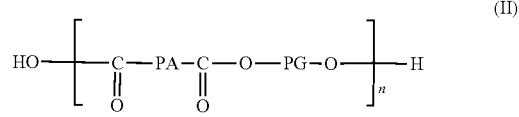

(where PA represents polyamide which is the hard segment, and PG represents polyether which is the soft segment.)

Polyamide-polyether copolymers can be obtained, for example, by polycondensation of salt of diamine and dicarboxylic acid, lactams, or aminodicarboxylic acids (PA components), polyoxyalkylene glycols (PG components), such as polyoxyethylene glycols, and polyoxypropylene glycols (PG constituents), and dicarboxylic acids.

Commercial products of polyamide-polyether copolymers include "Pebax (registered trademark)" (by Arkema Corporation), "Daiamid-PAE" (by Daicel-Degussa Ltd.), "UBE Polyamide Elastomer" (by Ube Corporation), "Novamid PAE" (by Mitsubishi Engineering-Plastics Corporation), "Grilux" (by Toyobo Co., ltd.), and "Grilon ELX, ELY" (by EMS-chemie (Japan) Ltd.).

The soft segment of the polyamide-based elastomer can use the same material as the soft segment of the thermoplastic polyester-based elastomer described above. Thus, a description of the soft segment of the polyamide-based elastomer will be omitted.

The content of the hard segment in the polyamide-based elastomer can be the same as the content of the hard segment in the polyester-based elastomer described above. Thus, a description of the content of the hard segment in the polyamide-based elastomer will be omitted.

The content ratio of the soft segment in the polyamide-based elastomer can be the same as the content of the soft segment in the polyester-based elastomer described above. Accordingly, an explanation of the content of the soft segment in the polyamide-based elastomer will be omitted.

The melting point of the polyamide-based elastomer can be the same as the melting point of the polyester-based elastomer described above. Accordingly, an explanation of the melting point of the polyamide-based elastomer will be omitted.

(Branched Component)

The adhesive layer 10 may include a branched component if the adhesive layer 10 includes a thermoplastic elastomer.

A branched component is a polyvalent component having two or more functional groups. The inclusion of the branched component allows the thermoplastic elastomer contained in the adhesive layer 10 to have a branched structure. Since the adhesive layer 10 contains the branched component, the thermoplastic elastomer forming the adhesive layer 10 can have a branched structure, so that the shape stability during molding of the adhesive layer 10 can be easily enhanced. In this embodiment, the polyvalent component may have two or more functional groups, but the polyvalent component preferably has three or more functional groups.

When the thermoplastic elastomer is a polyester-based elastomer, at least one of an aromatic polycarboxylic acid having two or more carboxyl groups in the molecule and a polyhydric alcohol having two or more hydroxyl groups in the molecule can be used as the branched component.

In addition, when the thermoplastic elastomer is a polyurethane-based elastomer, at least one of a polyisocyanate-based compound having two or more isocyanate groups in the molecule and a polyol-based compound having two or more hydroxyl groups in the molecule can be used as the branched component.

Furthermore, when the thermoplastic elastomer includes a polyester-based elastomer and a polyurethane-based elastomer, by using at least one of a polyisocyanate-based compound and a polyol-based compound as the polyester-based elastomer, the branched component can include a polyester-based elastomer and a polyurethane-based elastomer having a branched structure.

Suitable aromatic polycarboxylic acids include, for example, aromatic dicarboxylic acid such as phthalic acid, terephthalic acid, isophthalic acid, orthophthalic acid, 2,6-naphthalenedicarboxylic acid, 2,7-naphthalenedicarboxylic acid, anthracenedicarboxylic acid, 4,4'-biphenyldicarboxylic acid, diphenoxyethanedicarboxylic acid, 4,4'-diphenyletherdicarboxylic acid, 5-sulfoisophthalic acid, and sodium 3-sulfoisophthalate; propane-1,2,3-tricarboxylic acid, 2-methylpropane-1,2,3-tricarboxylic acid, butane-1,2,4-tricarboxylic acid, butane-1,2,3,4-tetracarboxylic acid, trimellitic acid, trimesic acid, hemimellitic acid, pyromellitic acid, benzenepentacarboxylic acid, cyclohexane-1,2,4-tricarboxylic acid, cyclohexane-1,3,5-tricarboxylic acid, cyclohexane-1,2,4,5-tetracarboxylic acid, naphthalene-1,2,4-tricarboxylic acid, naphthalene-2,5,7-tricarboxylic acid, pyridine-2,4,6-tricarboxylic acid, naphthalene-1,2,7,8-tetracarboxylic acid, and naphthalene-1,4,5,8-tetracarboxylic acid. Among them, trimellitic acid is preferred. The aromatic polycarboxylic acid may be contained in the aromatic polyester alone, or two or more kinds of acids may be contained in combination. Also, in the hard segment, a portion of the aromatic polycarboxylic acid component may be replaced by an alicyclic or aliphatic carboxylic acid.

Suitable polyhydric alcohols include, for example, aliphatic dials, such as 1,4-butanediol, ethylene glycol, diethylene glycol, propylene glycol, dipropylene glycol, trimethylene glycol, pentamethylene glycol, hexamethylene glycol, neopentyl glycol, and decamethylene glycol; alicyclic diols, such as 1,1-cyclohexanedimethanol, 1,4-dicyclohexane dimethanol, and tricyclodecanedimethanol; aromatic dials, such as xylylene glycol, bis(p-hydroxy)diphenyl, bis(p-hydroxy)diphenyl propane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quaterphenyl; 1,2,4-butanetriol, 1,2,5-pentanetriol, 1,2,6-hexanetriol, 1,2,3,6-hexanetetrol, glycerin, diglycerin, triglycerin, tetraglycerin, pentaglycerin, hexaglycerin, triethanolamine, trimethylol ethane, trimethylol propane, ditrimethylol propane, tri-trimethylol propane, 2-methylpropanetriol, 2-methyl-1,2,4-butanetriol, pentaerythritol, dipentaerythritol, tripentaerythritol, methylglucoside, sorbitol, mannitol, sucrose, 1,3,5-trihydroxybenzene, 1,2,4-trihydroxybenzene, (poly)oxyethylene glycerin, (poly)oxypropylene glycerin, (poly)oxyethylene diglycerin, (poly)oxypropylene diglycerin, (poly)oxyethylene trimethylolpropane, (poly)oxypropylene trimethylolpropane, (poly)oxyethylene ditrimethylolpropane, (poly)oxypropylene ditrimethylolpropane, erythritol (also referred to as erythritol), (poly)oxyethylene pentaerythritol, (poly)oxypropylene pentaerythritol, (poly)oxyethylene dipentaerythritol, (poly)oxypropylene dipentaerythritol, and the like. Among them, pentaerythritol, trimethylol propane, ditrimethylol propane, and dipentaerythritol are preferred. The polyhydric alcohol may be contained in the aromatic polyester alone or two or more types of alcohols may be contained in combination.

Suitable polyisocyanate-based compounds includes, for example, aromatic-based polyisocyanates, such as trilene diisocyanate, diphenylmethane diisocyanate, polyphenylmethane polyisocyanate, modified diphenylmethane diisocyanate, xylylene diisocyanate, tetramethyl xylene diisocyanate, phenylene diisocyanate, and naphthalene diisocyanate; aliphatic-based polyisocyanates, such as hexamethylene diisocyanate, trimethylhexamethylene diisocyanate, lysine diisocyanate, and lysine triisocyanate; alicyclic-based polyisocyanates, such as hydrogenated diphenylmethane diisocyanate, hydrogenated xylylene diisocyanate, isophorone diisocyanate, and norbornene diisocyanate; or isocyanurates or multimeric compounds of these polyisocyanates, allophanate-type polyisocyanates, and burette-type polyisocyanates, and water-dispersible-type polyisocyanates. They may be used alone or two or more types of them may be used in combination.

Commercial products of polyisocyanate-based compounds include "Coronate" (by Tosoh Corporation), "Duranate" (by Asahi Kasei Corporation), and "Takenate" (by Mitsui Chemicals, Inc.).

Suitable polyol-based compounds include, for example, aliphatic polyols, alicyclic polyols, polyether-based polyols, polyester-based polyols, polycarbonate-based polyols, polyolefin-based polyols, polybutadiene-based polyols, polyisoprene-based polyols, (meth)acrylic-based polyols, and polysiloxane-based polyols. The compound may be used alone, or two or more kinds of compounds may be used in combination.

Suitable aliphatic polyols include, for example, aliphatic alcohols containing two hydroxyl groups, such as ethylene glycol, diethylene glycol, propylene glycol, dipropylene glycol, trimethylene glycol, dimethylol propane, neopentyl glycol, 2,2-diethyl-1,3-propanediol, 2-butyl-2-ethyl-1,3-propanediol, 1,4-tetramethylenediol, 1,3-tetramethylenediol, 2-methyl-1,3-trimethylenediol, 1,5-pentamethylenediol, 1,6-hexamethylenediol, 3-methyl-1,5-pentamethylenediol, 2,4-diethyl-1,5-pentamethylenediol, pentaerythritol diacrylate, 1,9-nonanediol, and 2-methyl-1,8-octanediol; sugar alcohols, such as xylitol and sorbitol; and aliphatic alcohols containing three or more hydroxyl groups, such as glycerin, trimethylol propane, and trimethylolethane.

Suitable alicyclic polyols include, for example, cyclohexanediols such as 1,4-cyclohexanediol, cyclohexyldimethanol; hydrogenated bisphenols such as hydrogenated bisphenol A; and tricyclodecanedimethanol.

Suitable polyether-based polyols include, for example, alkylene structure-containing polyether-based polyols such as polyethylene glycol, polypropylene glycol, polytetramethylene glycol, polybutylene glycol, polypentamethylene glycol, and polyhexamethylene glycol; and random or block copolymers of these polyalkylene glycols.

Suitable polyester-based polyols include, for example, a condensation polymer of a polyhydric alcohol and a polycarboxylic acid; a ring-opened polymer of a cyclic ester (lactone); and reactants of three components: a polyhydric alcohol, a polycarboxylic acid, and a cyclic ester.

Suitable polycarbonate-based polyols include, for example, a reactant of a polyhydric alcohol with phosgene; and a ring-opened polymer of a cyclic carbonate ester (alkylene carbonate, and the like).

Suitable polyhydric alcohol includes, for example, the above-described polyhydric alcohol, and the suitable alkylene carbonate includes, for example, ethylene carbonate, trimethylene carbonate, tetramethylene carbonate, and hexamethylene carbonate.

The polycarbonate-based polyol may be a compound having a carbonate bond in the molecule and a hydroxyl group at a terminal end, and may have an ester bond along with the carbonate bond.

Suitable polyolefin-based polyol includes, for example, that having a homopolymer or a copolymer of ethylene, propylene, butene or the like as a saturated hydrocarbon backbone and having a hydroxyl group at a molecular end thereof.

Suitable polybutadiene-based polyol includes, for example, that having a copolymer of butadiene as a hydrocarbon backbone and having a hydroxyl group at a molecular end thereof. The polybutadiene-based polyol may be a hydrogenated polybutadiene polyol, in which whole of or a part of an ethylenically unsaturated group contained in the structure thereof is hydrogenated.

Suitable polyisoprene-based polyol includes, for example, having a copolymer of isoprene as a hydrocarbon backbone and having a hydroxyl group at a molecular end thereof. The polyisoprene-based polyol may be a hydrogenated polyisoprene polyol, in which the whole of or a part of an ethylenically unsaturated group contained in the structure thereof is hydrogenated.

Suitable (meth)acrylic-based polyol includes (meth)acrylate ester having at least two hydroxy groups in a molecule of a polymer or a copolymer. Suitable (meth)acrylate ester includes, for example, (meth)alkyl acrylate such as (meth)methyl acrylate, (meth)ethyl acrylate, (meth)propyl acrylate, (meth)butyl acrylate, (meth)hexyl acrylate, (meth)octyl acrylate, (meth)2-ethylhexyl acrylate, (meth)decyl acrylate, (meth)dodecyl acrylate, and (meth)octadecyl acrylate.

Suitable polysiloxane-based polyols include, for example, dimethyl polysiloxane polyols and methylphenyl polysiloxane polyols.

The content of the branched component content is preferably 0.05 wt %-10 wt %, more preferably 0.1 wt %-5 wt %, and even more preferably 0.2 wt %-3 wt %. If the content of the branched component is within the above-described preferred range, the thermoplastic elastomer contained in the adhesive layer 10 can have a branched structure and maintain the flexibility of the adhesive layer 10.

The thermoplastic elastomer may include one or more of polyolefin-based elastomer, polystyrene-based elastomer, polybutadiene-based elastomer and the like in addition to polyester-based elastomer, polyurethane-based elastomer and polyamide-based elastomer.

(EVOH)

EVOH is a water-insoluble thermoplastic resin which is usually obtained by copolymerizing ethylene with vinyl ester-based monomer and then saponifying it. Vinyl acetate is generally used as the vinyl ester-based monomer from an economical point of view. Known polymerization methods, such as solution polymerization, suspension polymerization, and emulsion polymerization, can be used. Generally, the solution polymerization is employed using methanol as a solvent. The resulting ethylene-vinyl ester copolymer may also be saponified by known methods. EVOH includes primarily an ethylene structural unit and a vinyl alcohol structural unit, and contains a small amount of residual vinyl ester structural unit that has not been saponified.

Preferably, the content of the ethylene structural unit contained in EVOH is within a range of 20 mol %-60 mol %. When the content is in the range of 20 mol %-60 mol %, flexibility is exhibited. The content of ethylene structural unit can be measured, for example, according to ISO 14663-1 (1999).

Preferably, the degree of saponification of the vinyl ester component in EVOH is in the range of 80 mol %-100 mol %. If the degree of saponification is within the above-described range, flexibility can be exhibited. The degree of saponification of the vinyl ester component can be measured, for example, according to JIS K6726 (1994), where EVOH is a solution which is uniformly dissolved in a water/methanol solvent (water:methanol=9:1 (mass ratio)).

A melt flow rate (MFR) of EVOH (210° C., and load of 2,160 g) is preferably in a range of 1 g/10 min-50 g/10 min. If the MFR is within the above-described range, flexibility can be exhibited.

EVOH may be used alone or two or more types of EVOH may be used in combination with different ethylene content, degree of saponification, and MFR.

When the adhesive layer 10 does not contain thermoplastic elastomer and EVOH, the adhesive layer 10 preferably contains a polyolefin-based resin, a polyester-based resin, a polyamide-based resin, an acrylic resin, a polyurethane, a polyvinyl chloride, a polycarbonate, or the like (hereinafter, simply referred to as a polyolefin-based resin or the like) in place of the thermoplastic elastomer and EVOH. These resins may be used alone or two or more types of resins may be contained in combination.

Suitable polyolefin-based resin includes, for example, polyethylene, polypropylene, ethylene-propylene copolymer, polybutylene, and polymethylpentene. Suitable polyethylene includes low-density polyethylene (LPDE), high-density polyethylene (HDPE), and linear low-density polyethylene (L-LDPE). The polyolefin-based resin may be a modified polyolefin-based resin obtained by attaching an unsaturated carboxylic acid or its anhydride by an addition reaction, a graft reaction, or the like. Suitable modified polyolefin-based resin includes maleic acid modified polyethylene (PE-MAH).

Suitable polyester-based resin includes an aromatic polyester-based resin such as polyethylene terephthalate (PET), polytrimethylene terephthalate, polybutylene terephthalate, and polyethylene naphthalate.

Suitable polyamide-based resins include aliphatic polyamides such as polyamide 6, polyamide 66, polyamide 610, polyamide 10, polyamide 12, and polyamide 6-12, and copolymers thereof; semiaromatic polyamides synthesized from aromatic dicarboxylic acids and aliphatic diamines; and the like.

Suitable acrylic resin includes acrylic acid, methacrylic acid, and the like.

Suitable polyurethane includes polycarbonate-based polyurethane, polyether-based polyurethanes, and polyester-based polyurethanes, and modified products thereof.

Suitable polyvinyl chloride includes a vinyl chloride homopolymer polymerized by an emulsion polymerization process, a suspension polymerization process, a microsuspension polymerization process, a bulk polymerization process, or the like, known in the art; a copolymer with a monomer that can be copolymerized with a vinyl chloride monomer; a graft copolymer in which a polymer is subjected to a graft polymerization with a vinyl chloride monomer; or the like.

Suitable polycarbonates include aromatic polycarbonate resins, aliphatic polycarbonate resins, and aromatic-aliphatic polycarbonate resins.

(Sub-Component)

In addition to the thermoplastic elastomer, the branched component, and EVOH, the adhesive layer 10 may contain, as sub-components, for example, ethylene-vinyl acetate copolymer (EVA), polyolefin-based resin, polyester-based resin, polyamide-based resin, acrylic resin, polyurethane, polyvinyl chloride, and polycarbonate (hereinafter simply referred to as EVA and the like). Among them, EVA or polyolefin-based resin are preferred. They may be used alone, or two or more types of them may contained. Since the polyolefin-based resin, the polyester-based resin, the polyamide-based resin, the acrylic resin, the polyurethane, the polyvinyl chloride, the polycarbonate, and the like are the same as the above-described polyolefin-based resin, the polyester-based resin, the polyamide-based resin, the acrylic resin, the polyurethane, the polyvinyl chloride, the polycarbonate, and the like, detailed description thereof will be omitted.

A content of the sub-component may be suitably designed according to the types of the thermoplastic elastomer and the sub-component. When the sub-component is EVA, a content ratio of the thermoplastic elastomer to EVA is preferably 90:10-50:50, and more preferably 80:20-60:40.

The adhesive layer 10 may contain an additive in addition to the above-described components. Suitable additives include pigments, fillers, antioxidants, hydrolytic stabilizers, anti-blocking agents, and the like.

The content of the thermoplastic elastomer in the adhesive layer 10 is preferably 70 wt % or more, more preferably 90 wt % or more, further preferably 95 wt % or more, and even more preferably 99.5 wt % or more, of the total amount of the adhesive layer 10. The adhesive layer 10 may be formed of a thermoplastic elastomer.

The overall thickness of the adhesive layer 10 can be suitably designed, and is, for example, preferably 1 μm-50 μm, and more preferably 5 μm-40 μm.

A melt strength of the adhesive layer 10 is preferably 7.5 mN or more, more preferably 8.0 mN or more, further preferably 9.0 mN or more, even more preferably 10 mN or more, and most preferably 20.0 mN or more. If the melt strength of the adhesive layer 10 is 7.5 mN or more, the adhesive layer 10 can have a stable shape during molding in a melt state to the extent that it can be stretched, using various molding methods such as an inflation method or a T-die method.

[Second Layer]

The second layer 20 is disposed on the adhesive layer 10 (+Z-axis direction) and has an airtight function. The second layer 20 is provided with an intermediate layer 21 and an airtight layer 22, and is formed by laminating the intermediate layer 21 and the airtight layer 22 on the adhesive layer 10 in this order.

(Intermediate Layer)

The intermediate layer 21 is provided between the adhesive layer 10 and the airtight layer 22 and has a function of bonding the adhesive layer 10 with the airtight layer 22. The composition of the intermediate layer 21 may be selected depending on the compositions and the thicknesses of the adhesive layer and the adhesive layer 10 and the airtight layer 22, use of the multilayer film 1, and the like. By providing the intermediate layer 21, the bonding force between the adhesive layer 10 and the airtight layer 22 can be enhanced, and thus interlayer exfoliation in the multilayer film 1 can be suppressed. Further, it is possible to improve the characteristics such as mechanical strength by providing the intermediate layer 21.

The intermediate layer 21 may include a thermoplastic elastomer or the like. The thermoplastic elastomer may be used alone or two or more types of the thermoplastic elastomers may be included. As the thermoplastic elastomer or the like, the same thermoplastic elastomer or the like as the thermoplastic elastomer or the like used for the adhesive layer 10 described above can be used. Therefore, a detailed description of the thermoplastic elastomer or the like will be omitted.

A content of the hard segment in the thermoplastic elastomer in the intermediate layer 21 is preferably 20 wt %-95 wt % with respect to 100 wt % of the thermoplastic elastomer, more preferably 30 wt %-90 wt %, and even more preferably 35 wt %-85 wt %. By setting the content of the hard segment within the preferred range, mechanical strength, heat resistance, and durability under high temperature and high humidity of the multilayer film 1 can be improved, and the multilayer film 1 can have adequate elasticity, flexibility, and formability.

The content of the soft segment in the thermoplastic elastomer in the intermediate layer 21 is preferably 5 wt %-80 wt %, more preferably 10 wt %-70 wt %, and even more preferably 15 wt %-65 wt % with respect to 100 wt % of the thermoplastic elastomer. By setting the content of the soft segment within the preferred range, adequate elasticity, flexibility, and formability of the multilayer film 1 and the resulting laminated body are ensured, and the mechanical strength of the multilayer film and the resulting laminated body is improved.

The melting point of the intermediate layer 21 is preferably higher than the melting point of the adhesive layer 10. With the condition that the melting point of the intermediate layer 21 is higher than the melting point of the adhesive layer 10, the melting point of the intermediate layer 21 is, for example, preferably 90° C.-300° C., more preferably 130° C.-250° C. or more, and even more preferably 150° C.-220° C. The melting point of the intermediate layer 21 is adjusted in accordance with the type and the content of the thermoplastic elastomer used in the intermediate layer 21, the types and the contents of the hard segment and the soft segment constituting the thermoplastic elastomer, and the like.

Preferably, the melting point of the intermediate layer 21 is higher than the melting point of the adhesive layer 10, as described above. The difference between the melting point of the intermediate layer 21 and the melting point of the adhesive layer 10 is preferably 10° C.-150° C., and more preferably 20° C.-100° C. When the multilayer film 1 is bonded to the base fabric 2 by heat, by setting the difference between the melting point of the intermediate layer 21 and the melting point of the adhesive layer 10 to be within the above-described range, it is possible to maintain the bonding performance between the adhesive layer 10 and the airtight layer 22 even though the heating temperature during manufacturing may vary to some extent. Therefore, it is possible to reduce an occurrence of a defective product in which the bonding with the base fabric 2 is not good due to insufficient softening of the adhesive layer 10, or in which the bonding between the adhesive layer 10 and the airtight layer 22 is impaired due to deformation or deterioration of the intermediate layer 21, thereby improving the production stability.

The intermediate layer 21, in the same manner as the adhesive layer 10, can include a branched component in addition to the thermoplastic elastomer. Since for the branched component the same branched component as that of the adhesive layer 10 can be used, the detailed description of the branched component will be omitted. Since the intermediate layer 21 contains the branched component, the thermoplastic elastomer forming the intermediate layer 21 can have a branched structure, so that it is easy to enhance the shape stability during molding of the intermediate layer 21.

The content of the branched component can be made the same as that of the adhesive layer 10. If the content of the branched component is 0.1 wt %-10 wt %, the thermoplastic elastomer contained in the intermediate layer 21 can have a branched structure and maintain the flexibility of the intermediate layer 21.

If the intermediate layer 21 does not contain the thermoplastic elastomer, the branched component, and EVOH, the intermediate layer 21, in the same manner as the adhesive layer 10, can contain, in place of them, a polyolefin-based resin, a polyester-based resin, a polyamide-based resin, an acrylic resin, a polyurethane, polyvinyl chloride, a polycarbonate, and the like. They may be used alone, or two or more types of them may be included. Since for the polyolefin-based resin and the like the same polyolefin-based resin and the like as that in the adhesive layer 10 may be used, the detailed description of the polyolefin-based resin and the like will be omitted.

The intermediate layer 21 can include EVA, polyolefin-based resin, polyester-based resin, polyamide-based resin, acrylic resin, polyurethane, polyvinyl chloride, polycarbonate, and the like as a sub-component, in the same manner as the adhesive layer 10. Among them, EVA or polyolefin-based resin is preferred. They may be used alone or two or more types of them may be included.

The content of the sub-component can be the same as that of the adhesive layer 10.

The intermediate layer 21 may contain additives, such as pigments, fillers, antioxidants, hydrolytic stabilizers, and anti-blocking agents, in the same manner as the adhesive layer 10, in addition to the components described above.

The content of the thermoplastic elastomer in the intermediate layer 21 is preferably 70 wt % or more, more preferably 90 wt % or more, further preferably 95 wt % or more, and even more preferably 99.5 wt % or more, of the total amount of the intermediate layer 21. The intermediate layer 21 may be formed of a thermoplastic elastomer.

The overall thickness of the intermediate layer 21 can be suitably designed, and is, for example, preferably 1 μm-50 μm, and more preferably 3 μm-30 μm.

A melt strength of the intermediate layer 21 is preferably 7.5 mN or more, more preferably 8.0 mN or more, further preferably 9.0 mN or more, even more preferably 10 mN or more, and most preferably 20.0 mN or more. If the melt strength of the intermediate layer 21 is 7.5 mN or more, a shape of the intermediate layer 21 can be stably maintained in a melt state to the extent that it can be stretched, using various molding methods such as an inflation method or a T-die method.

The intermediate layer 21 may be composed of two or more layers. When the intermediate layer 21 includes a plurality of layers, compositions of the respective layers may be the same or may be different from each other. When the plurality of intermediate layers 21 are provided, a material of each intermediate layer 21 is appropriately selected to improve the adhesion between layers in the multilayer film 1, so that the bonding between the layers can be made stronger. Therefore, interlayer exfoliation can be further suppressed in the multilayer film 1.

(Airtight Layer)

The airtight layer 22 is disposed above the intermediate layer 21 (+Z-axis direction) as described above and has an airtight function. Therefore, for example, when the multilayer film 1 is formed as a bag, it is possible to more reliably prevent air accumulated in the bag from leaking out.

The airtight layer 22 may contain a thermoplastic elastomer or the like. The thermoplastic elastomer may be used alone or two or more types of the thermoplastic elastomers may be included. As the thermoplastic elastomer or the like, the same thermoplastic elastomer or the like as the thermoplastic elastomer or the like used for the adhesive layer 10 described above can be used. Therefore, the detailed description of the thermoplastic elastomer or the like will be omitted.

The content of the hard segment in the thermoplastic elastomer in the airtight layer 22 is preferably 30 wt %-95 wt % with respect to 100 wt % of the thermoplastic elastomer, more preferably 35 wt %-90 wt %, and even more preferably 40 wt %-85 wt %. By providing the preferred range of the hard segment content, the mechanical strength, heat resistance, and durability under high temperature and high humidity of the multilayer film 1 can be improved, and the multilayer film 1 can have adequate elasticity, flexibility, and formability.

The content of the soft segment in the thermoplastic elastomer in the airtight layer 22 is preferably 5 wt %-70 wt % with respect to 10.0 wt % of the thermoplastic elastomer, more preferably 10 wt %-65 wt %, and even more preferably 15 wt %-60 wt %. By providing the preferred range of the content of the soft segment, the proper elasticity, flexibility, and formability of the multilayer film 1 and the resulting laminated body can be ensured, and the mechanical strength of the multilayer film 1 and the resulting laminated body is also improved.

The melting point of the airtight layer 22 is preferably higher than the melting point of the adhesive layer 10, in the same manner as that of the intermediate layer 21. With the condition that the melting point of the airtight layer 22 is higher than the melting point of the adhesive layer 10, the melting point of the airtight layer 22 is preferably, for example, 90° C. or more, more preferably 150° C. or more, and even more preferably 180° C. or more. Further, the upper limit of the melting point of the airtight layer 22 may be higher than the melting point of the adhesive layer 10, preferably less than or equal to 300° C., more preferably less than or equal to 250° C., and even more preferably less than or equal to 230° C. The melting point of the airtight layer 22 is adjusted in accordance with the type and the content of the thermoplastic elastomer used for the intermediate layer 21, and the types and the contents of the hard segment and the soft segment constituting the thermoplastic elastomer, in the same manner as the intermediate layer 21.

Preferably, the melting point of the airtight layer 22 is higher than the melting point of the adhesive layer 10, as described above. The difference between the melting point of the airtight layer 22 and the melting point of the adhesive layer 10 is preferably 10° C.-150° C., and more preferably 20° C.-100° C. When the multilayer film 1 is bonded to the base fabric 2 by heat, by setting the difference between the melting point of the airtight layer 22 and the melting point of the adhesive layer 10 to be within the above-described range, it is possible to ensure the airtight performance of the airtight layer 22 and the bonding performance of the adhesive layer 10 even though the heating temperature during manufacturing may vary to some extent. Accordingly, it is possible to reduce an occurrence of a defective product in which the bonding with the base fabric 2 is not good due to insufficient softening of the adhesive layer 10, or in which the airtightness is impaired due to deformation or deterioration of the airtight layer 22, thereby improving the production stability.

The airtight layer 22, in the same manner as the adhesive layer 10, can include a branched component in addition to the thermoplastic elastomer. Since for the branched component the same branched component as that of the adhesive layer 10 can be used, the detailed description of the branched component will be omitted. Since the airtight layer 22 contains the branched component, the thermoplastic elastomer forming the airtight layer 22 can have a branched structure, so that it is easy to enhance the shape stability during molding of the airtight layer 22.

The content of the branched component can be made the same as that of the adhesive layer 10. If the content of the branched component is 0.1 wt %-10 wt %, the thermoplastic elastomer contained in the airtight layer. 22 can have a branched structure and maintain the flexibility of the airtight layer 22.

If the airtight layer 22 does not contain, in the same manner as the adhesive layer 10, the thermoplastic elastomer, the branched component, and EVOH, the airtight layer 22 can contain, in place of them, a polyolefin-based resin, a polyester-based resin, a polyamide-based resin, an acrylic resin, a polyurethane, polyvinyl chloride, a polycarbonate, and the like. They may be used alone, or two or more types of them may be included. Since for the polyolefin-based resin and the like the same polyolefin-based resin and the like as that in the adhesive layer 10 may be used, the detailed description of the polyolefin-based resin and the like will be omitted.

The airtight layer 22 can include EVA, polyolefin-based resin, polyester-based resin, polyamide-based resin, acrylic resin, polyurethane, polyvinyl chloride, polycarbonate, and the like as a sub-component, in the same manner as the adhesive layer 10. Among them, EVA or polyolefin-based resin is preferred. They may be used alone or two or more types of them may be included.

The content of the sub-component can be the same as that of the adhesive layer 10.

The airtight layer 22, in the same manner as the intermediate layer 21, may contain, in addition to the components described above, additives such as pigments, fillers, antioxidants, hydrolytic stabilizers, and anti-blocking agents.

The content of the thermoplastic elastomer in the airtight layer 22 is preferably 70% or more, more preferably 90% or more, further preferably 95% or more, and even more preferably 99.5% or more wt % of the total amount of the airtight layer 22. The airtight layer 22 may be formed of a thermoplastic elastomer.

The overall thickness of the airtight layer 22 can be suitably designed, and is preferably, for example, 1 μm-50 μm, and even more preferably 3 μm-30 μm.

A melt strength of the airtight layer 22 is preferably 7.5 mN or more, more preferably 8.0 mN or more, further preferably 9.0 mN or more, even more preferably 10 mN or more, and most preferably 20.0 mN or more. If the melt strength of the airtight layer 22 is 7.5 mN or more, a shape of the airtight layer 22 can be stably maintained in a melt state to the extent that it can be stretched, using 1.0 various molding methods such as an inflation method or a T-die method.

The airtight layer 22 may be composed of two or more layers. When the airtight layer 22 includes a plurality of layers, compositions of the respective layers may be the same or may be different from each other. When the plurality of airtight layers 22 are provided, a material of each airtight layer 22 is appropriately selected to improve the adhesion between layers in the multilayer film 1, so that the bonding between the layers can be made stronger. Therefore, interlayer exfoliation can be further suppressed in the multilayer film 1.

When any one or more of the layers of the adhesive layer 10, the intermediate layer 21, and the airtight layer 22 constituting the multilayer film 1 contains a thermoplastic elastomer, other layers not containing the thermoplastic elastomer may contain EVOH, polyolefin-based resin, polyester-based resin, polyamide-based resin, acrylic resin, polyurethane, polyvinyl chloride, polycarbonate, and the like. Among them, EVOH is preferable. The above-described resin may be used alone, or two or more of the resins may be contained. The same EVOH, polyolefin-based resin, polyester-based resin, polyamide-based resin, acrylic resin, polyurethane, polyvinyl chloride, polycarbonate, and the like as those in the above-described adhesive layer 10 may be used for the EVOH, polyolefin-based resin, polyester-based resin, polyamide-based resin, acrylic resin, polyurethane, polyvinyl chloride, polycarbonate, and the like.

(Manufacturing of Multilayer Film)

An example of the method of manufacturing the multilayer film 1 will be described. The material (raw material) of the adhesive layer 10, the intermediate layer 21, and the airtight layer 22 are melted using a melt kneading apparatus such as an extruder or a pressure kneader, respectively, and molded simultaneously using a known molding method such as an extrusion molding (coextrusion) method, an inflation method, and a T-die method. Thus, the adhesive layer 10, the intermediate layer 21, and the airtight layer 22 can be obtained as separated sheets. The adhesive layer 10 and the intermediate layer 21 are then bonded, and the intermediate layer 21 and the airtight layer 22 are bonded so that these layers are laminated in the order of the intermediate layer 21 and the airtight layer 22 above the adhesive layer 10. Thus, the multilayer film 1 is provided. Among them, the inflation method is preferable, which is capable of obtaining a layer with a wide area and excellent in productivity.

Figure 2:
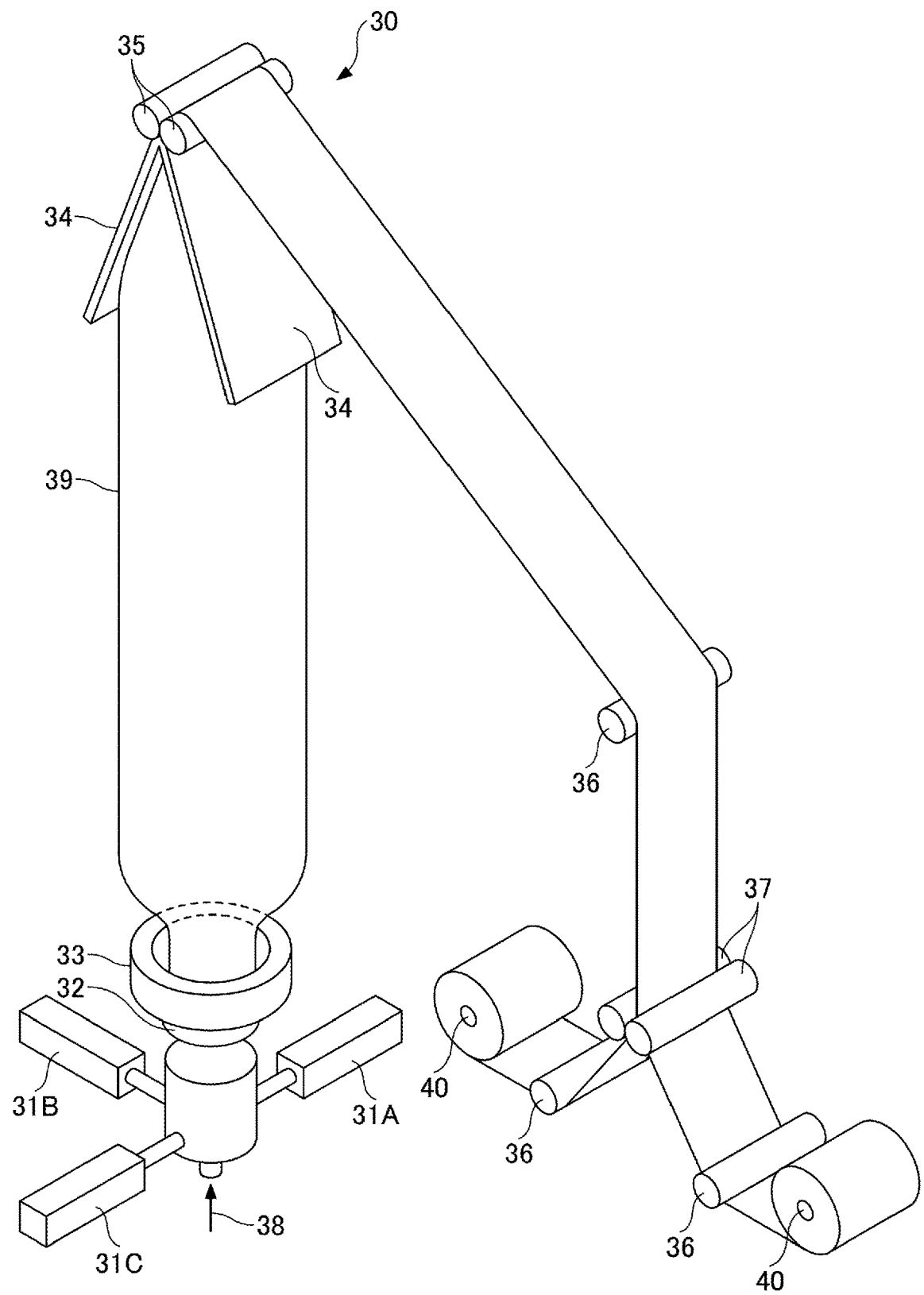
FIG. 2 is a diagram depicting an example of an inflation molding apparatus having a plurality of melt kneading apparatuses.

When using the inflation method, for example, an inflation molding apparatus with a plurality of (in this embodiment, three) melt kneading apparatuses can be used. FIG. 2 illustrates an example of the inflation molding apparatus with a plurality of melt kneading apparatuses. As shown in FIG. 2, the inflation molding apparatus 30 includes three melt kneading apparatuses 31A, 31B and 31C, an annular die 32, an air ring 33, a pair of guide plates 34, a pinch roll 35, a guide roll 36, and a trimming 37.

Materials constituting the adhesive layer 10, the intermediate layer 21, and the airtight layer 22 are charged into the three melt kneading apparatuses 31A, 31B, and 31C, respectively, to be melted within the three melt kneading apparatuses 31A, 31B, and 31C. When melts of the materials constituting the adhesive layer 10, the intermediate layer 21, and the airtight layer 22 are extruded into the annular die 32 from the melt kneading apparatuses 31A, 31B, and 31C, respectively, the respective melts are extruded from an annular formed outlet port 321 of the annular die 32 into a cylindrical film shape, as shown in FIG. 3.

Figure 3:
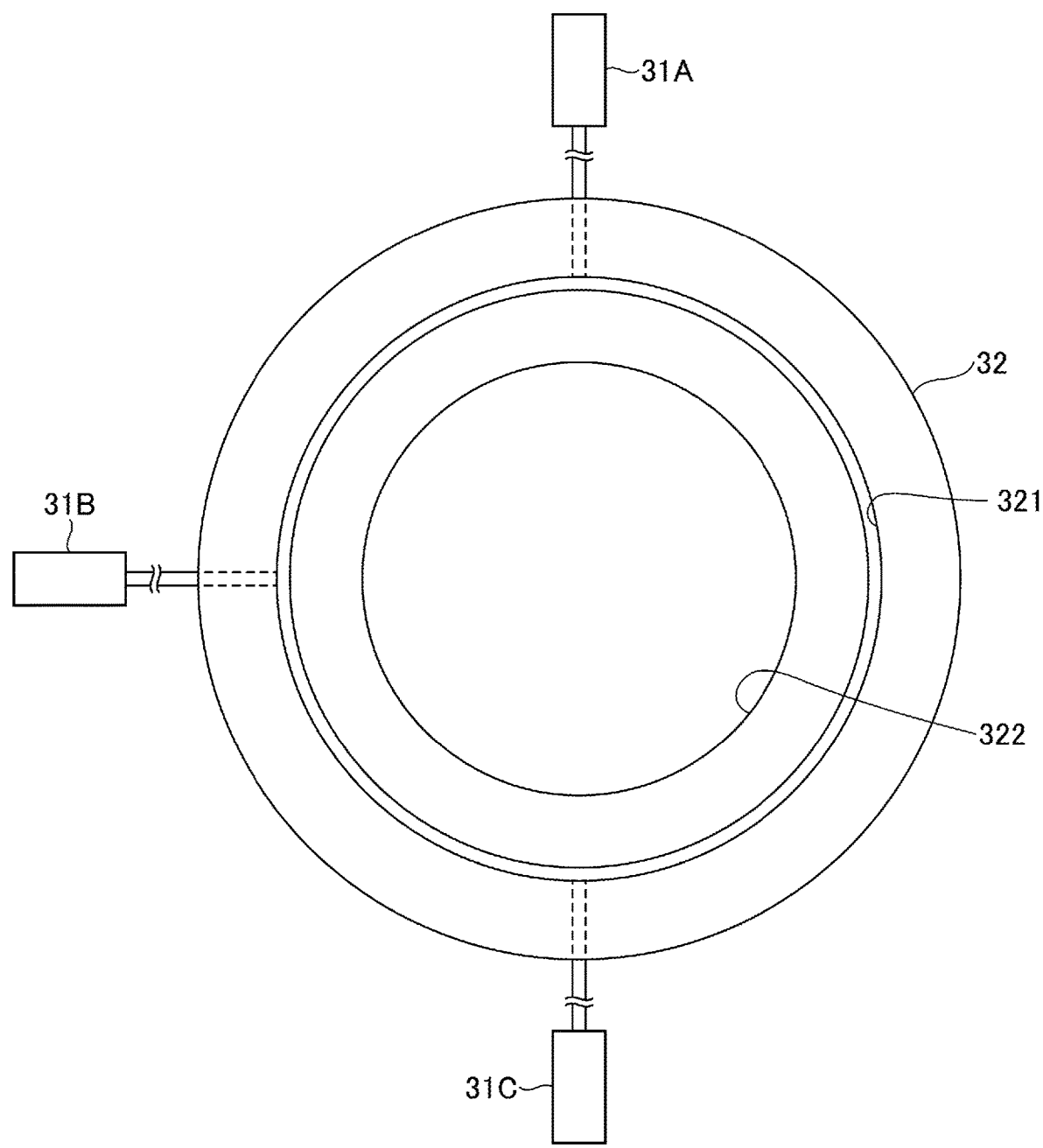
FIG. 3 is a top view illustrating an annular die.

As shown in FIG. 2, air 38 is supplied from the bottom of the annular die 32, and air 38 is discharged upwardly from an air outlet 322 provided in the center of the annular die 32 in a plan view, as shown in FIG. 3. As shown in FIG. 2, an air flow of air 38 discharged from the top of the annular die 32 inflates a film-like melt extruded from the annular die 32 in a cylindrical shape. At the same time, the melt expanded in a tube shape is air-cooled and solidified by an air supplied from the air-ring 33. Thus, the cylindrical inflation film (bubble) 39 is pulled up.

The cylindrical inflation film 39 is drawn into a pinch roll 35 while squeezing the air in the interior of the inflation film 39 along the pair of guide plates 34 positioned above the annular die 32. The inflation film 39 is pressed flat by the pinch roll 35. The flattened inflation film 39 is separated into two sheets at the interface of adhesive layers 10A and 10B by the trimming 37 through the guide roll 36 located downstream of the pinch roll 35. The separated inflation film 39 is wound into a pair of winding rolls 40 via various guide rolls 36. Thus, the two multilayer films 1 are collected in the roll state.

Figure 4:
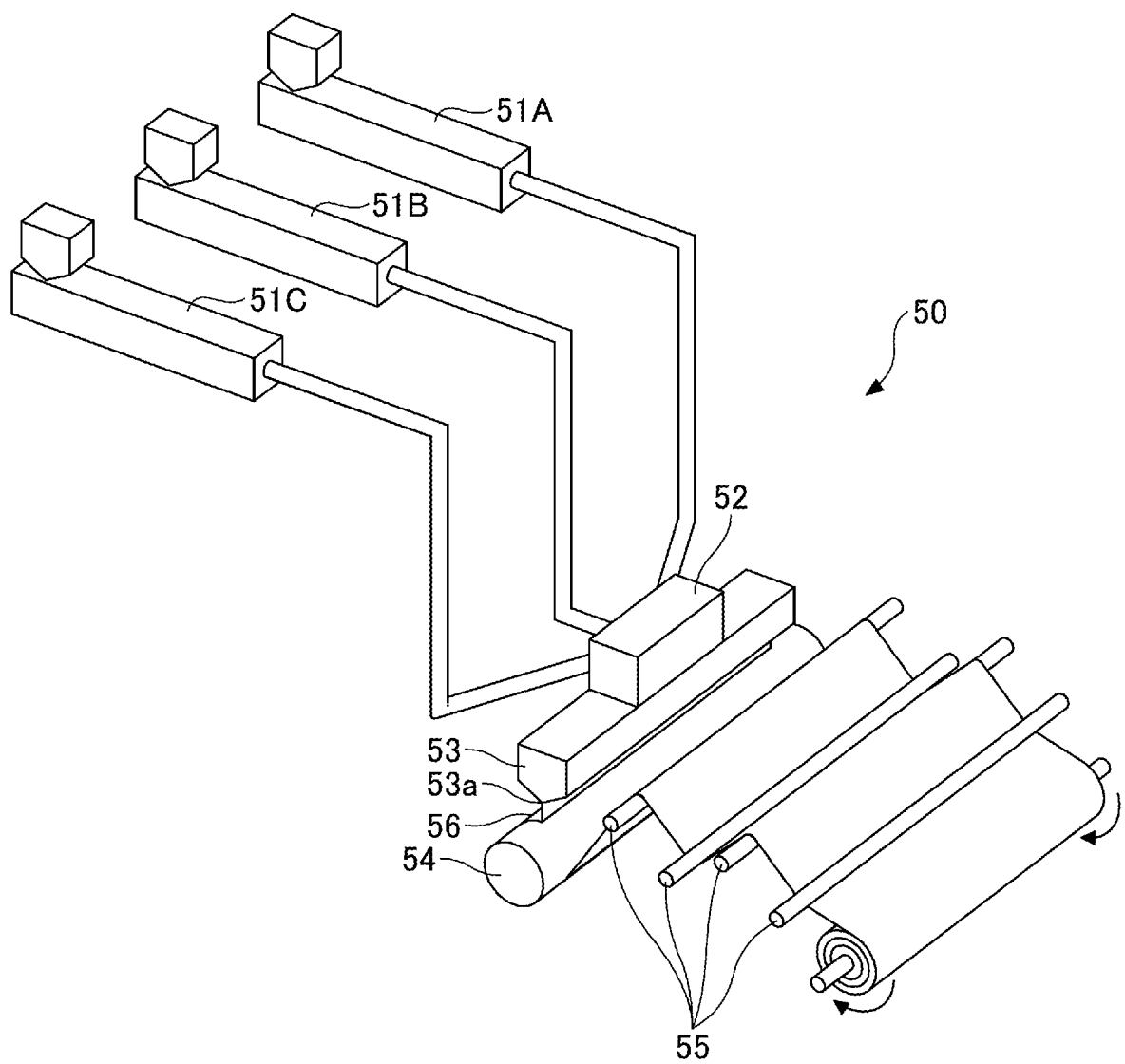
FIG. 4 is a diagram illustrating an example of a T-die extrusion molding apparatus provided with a plurality of melt kneading apparatuses.

When using the T-die method, for example, a T-die extruder with a plurality of (in this embodiment, three) melt kneading apparatuses can be used. FIG. 4 illustrates an example of the T-die extruder with a plurality of melt kneading apparatuses. As shown in FIG. 4, the T-die extruder 50 includes three melt kneading apparatuses 51A, 51B and 51C, a 3-layered-3-kinds distribution type feed block 52, a multi-manifold die (multi-manifold type cap) 53, a cooling roll 54, and a guide roll 55.

Figure 5:
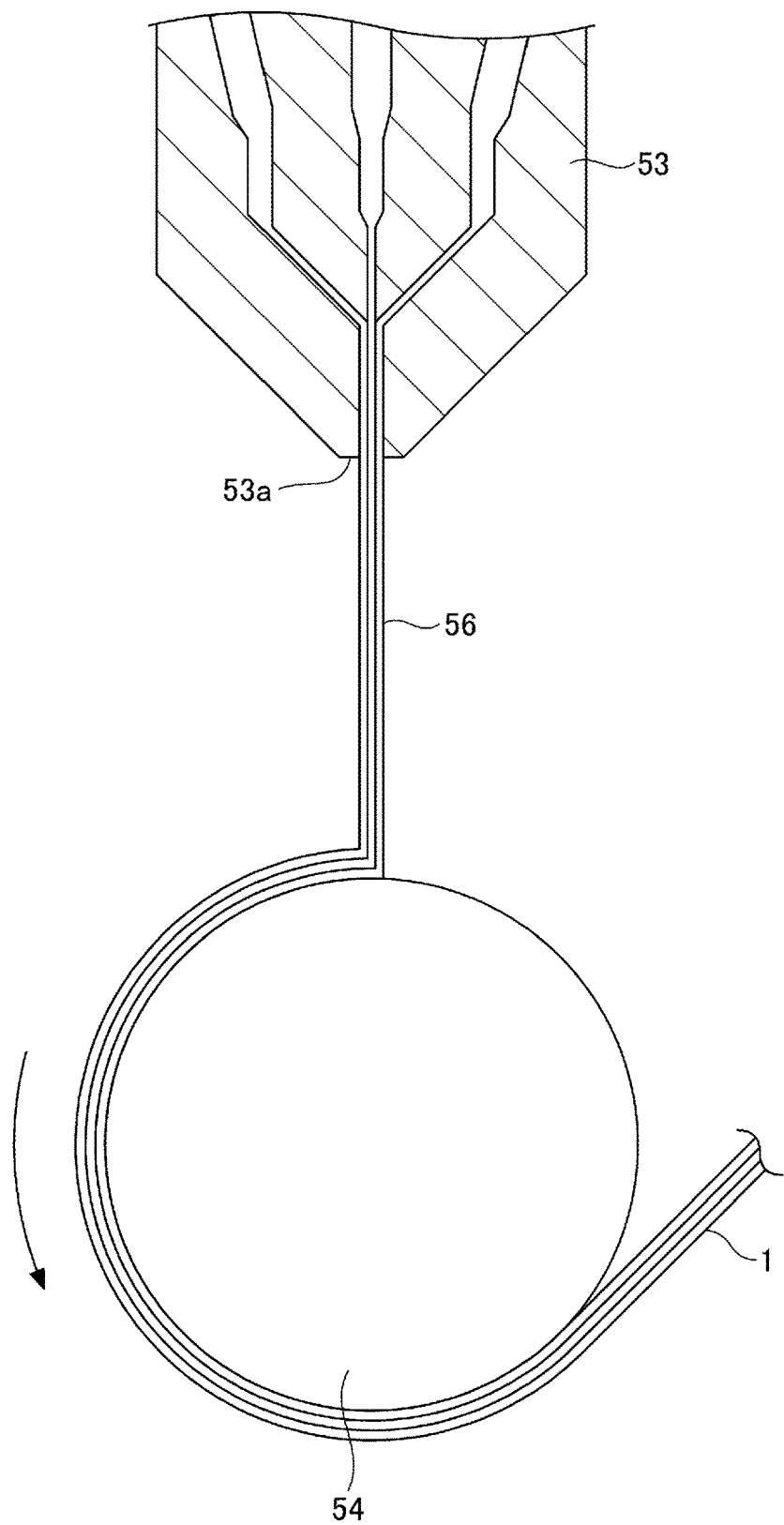
FIG. 5 is a diagram illustrating a state in which a molten multilayer film is discharged from a discharge port of a multi-manifold die.

The materials constituting the adhesive layer 10, the intermediate layer 21, and the airtight layer 22 are melted and kneaded in the melt kneading apparatuses 51A, 51B, and 51C, respectively. The melt-kneaded melts of the adhesive layer 10, the intermediate layer 21, and the airtight layer 22 are fed to the 3-layered-3-kinds distribution type feed block 52 to be distributed into a three-layer structure. Thereafter, as shown in FIG. 5, the molten multilayer film 56 formed from the melt of the adhesive layer 10, the intermediate layer 21, and the airtight layer 22 is discharged from the outlet port (die lip) 53a of the multi-manifold die 53 in a film shape. The discharged molten multilayer film 56 is cooled while wrapped around the cooling roll 54. Thus, the multilayer film 1 in which the intermediate layer 21 and the airtight layer 22 are laminated on the adhesive layer 10 is produced. Thereafter, as shown in FIG. 4, the multilayer film 1 is wound onto the winding roll 57 via various guide rolls 55. Thus, the multilayer film 1 is collected in the roll state.

Alternatively, as another molding method, an extrusion lamination method, in which a melt of any one of the adhesive layer 10, the intermediate layer 21, or the airtight layer 22 is extruded onto a sheet of any one of the adhesive layer 10, the intermediate layer 21, or the airtight layer 22, may be used. Thus, the multilayer film 1 in which the intermediate layer 21 and the airtight layer 22 are sequentially laminated on the adhesive layer 10 can be produced.

The produced multilayer film 1 can be cut into a desired shape and size depending on the application. The multilayer film 1 may be wound around a roll or the like and may be cut by being unwound with a required length when used. In addition, the multilayer film 1 may be provided with a release sheet at least on the side of the adhesive layer 10. Thus, the adhesive layer 10 can be protected until just prior to use.

As noted above, the multilayer film 1 includes the adhesive layer 10 and the second layer 20, wherein the adhesive layer 10, the second layer 20, or both contains a thermoplastic elastomer. The adhesive layer 10 or the second layer 20 uses, as the thermoplastic elastomer, at least one selected from the group consisting of a polyester-based elastomer, a polyurethane-based elastomer, and a polyamide-based elastomer, and has a melt strength of 7.5 mN or more of the multilayer film 1. By using at least a polyester-based elastomer, a polyurethane-based elastomer, or a polyamide-based elastomer as the thermoplastic elastomer used in each layer constituting the multilayer film 1, a shape of the multilayer film 1A can be stably maintained in a melt state to the extent that it can be stretched during molding. Accordingly, the multilayer film 1 can have excellent molding stability. Therefore, the multilayer film 1 can be effectively used in a variety of molding methods, such as the inflation method and the T-die method.

Figure 6:
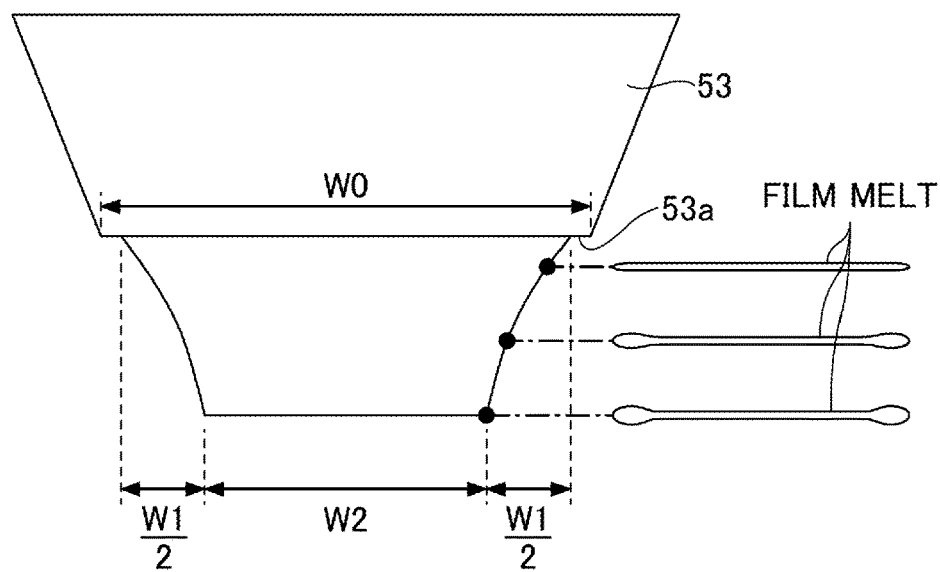
FIG. 6 is a diagram illustrating a state in which a melt is extruded from a T-die.

The stability of the shape of the multilayer film 1 can be assessed by, for example, observing the molding condition of the inflation film drawn from the annular die 32 of the inflation molding apparatus 30 as shown in FIG. 2 when molding using the inflation method. Also, when molding using the T-die method, it can be evaluated by measuring the neck-in rate (in %) of the film-like melt extruded from the outlet port 53a of the multi-manifold die 53 provided by the T-die extruder 50 as shown in FIG. 4. As shown in FIG. 6, the neck-in width W1 of the film-like melt is a difference between the width W0 of the outlet port 53a and the width W2 of the film-like melt (film width), that is the neck-in width W1=the width W0 of the outlet port 53a–the film width W2. The neck-in rate is a percentage value in which the sum of two widths appearing at both ends of the outlet port 53a is divided by the width of the outlet port 53a ((sum of neck-in widths/width of outlet)×100(%)). The higher the neck-in rate, the more the film-like melt tends to deform and the thicker both ends of the film-like melt.

Therefore, even when the multilayer film 1 is molded using, for example, the inflation method, it is possible to maintain the stability of the multilayer film 1 during molding. Even when the multilayer film 1 is molded using, for example, the T-die method, it is possible to suppress the reduction of the film width extruded from the T-die, and suppress the increase of the neck-in width. Therefore, the multilayer film 1 can have an excellent yield during molding.

In addition, since it is possible to suppress deformation of the multilayer film 1 during molding, it is possible to reduce the area of deformation to be cut and the load thereon, so that it is possible to reduce the cost of production.

In the multilayer film 1, the melt strength of at least one of the adhesive layer 10 or the second layer 20 can be made 7.5 mN or more. Accordingly, in the multilayer film 1, because the adhesive layer 10 and the second layer 20 can stably have a shape in a melt state to the extent that the adhesive layer 10 and the second layer 20 can be stretched during molding, it is possible to mold the multilayer film 1 even when various molding methods such as the inflation method or the T-die method are used.

In the multilayer film 1, the second layer 20 may be provided with the airtight layer 22. Accordingly, the multilayer film 1 can maintain the stability of the molding while maintaining the airtightness.

In the multilayer film 1, the second layer 20 may include an intermediate layer 21 between the adhesive layer 10 and the airtight layer 22. Accordingly, since the bonding force between the adhesive layer 10 and the airtight layer 22 can be increased, it is possible to maintain the stability of molding while suppressing an occurrence of interlayer exfoliation in the multilayer film 1.

In the multilayer film 1, at least one of the adhesive layer 10, the intermediate layer 21, and the airtight layer 22 can have a melt strength of 7.5 mN or more. As a result, the adhesive layer 10, the intermediate layer 21, and the airtight layer 22 can stably have a shape in a melting state to the extent that they can be stretched during molding. Therefore, the adhesive layer 10, the intermediate layer 21, and the airtight layer 22 can be formed while stably maintaining the shape of each of the adhesive layers 10, the intermediate layer 21, and the airtight layer 22 even by various molding methods such as the inflation method or the T-die method.

In the multilayer film 1, at least one of the adhesive layer 10 and the second layer 20 may have a branched component, and the thermoplastic elastomer contained in the adhesive layer 10 or the second layer 20 may have a branched structure. By having a branched structure, the thermoplastic elastomer is more susceptible to suppressing deformation during molding than a thermoplastic elastomer having a generally linear structure, such as an olefin-based thermoplastic elastomer. Accordingly, in the multilayer film 1, at least one of the adhesive layer 10 and the second layer 20 includes a branched component, and the thermoplastic elastomer has a branched structure. Therefore, it is possible to maintain a more stable molded state even when various molding methods are used.

The content of the branched component of the multilayer film 1 may be 0.1 wt %-10 wt %. Depending on the content of the branched component, in the adhesive layer 10 and the second layer 20 the content of the thermoplastic elastomer containing the branched structure may be adjusted. Thus, in the multilayer film 1, it is possible to maintain the molded state more stably and have a flexibility using various molding methods such as the inflation method and the T-die method.

In the multilayer film 1, the adhesive layer 10, the second layer 20, or both may contain an ethylene-vinyl alcohol-based copolymer. The melt strength of the adhesive layer 10 and the second layer 20 can be easily adjusted to any magnitude, by including the ethylene-vinyl alcohol-based copolymer as a component other than the thermoplastic elastomer in the adhesive layer 10 and the second layer 20. Accordingly, the multilayer film 1 can maintain a more stable molded state and have flexibility even when various molding methods such as the inflation method or the T-die method are used.

In the multilayer film 1, the base fabric 2 can be used as a base fabric for an air bag. Thus, the multilayer film 1 can be effectively used as a protective film provided on a surface of the base fabric of the air bag formed into a shape of a bag.

<Laminated Body>

Figure 7:
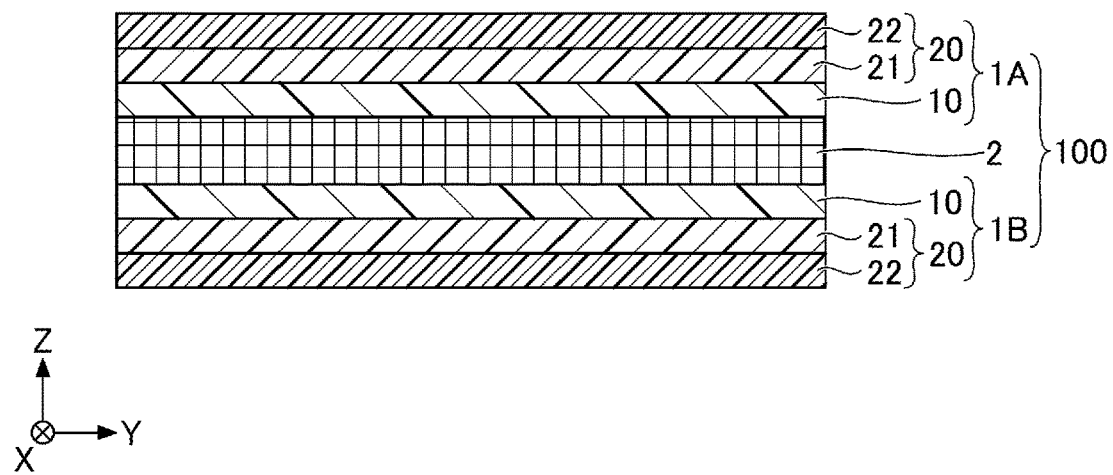
FIG. 7 is a cross-sectional view schematically illustrating an example of a laminated body.

Next, a laminated body having a multilayer film 1 according to the present embodiment will be described. FIG. 7 is a cross-sectional view schematically illustrating an example of the laminated body. As shown in FIG. 7, the laminated body. 100 includes multilayer films 1A and 1B, and the base fabric 2, where the multilayer films 1A and 1B adhere to the base fabric 2.

The multilayer film 1A is provided on the upper surface (in the +Z-axis direction) of the base fabric 2, and the multilayer film 1B is provided on the lower surface (in the −Z-axis direction) of the base fabric 2.

(Base Fabric)

The base fabric 2 functions as a support for ensuring the mechanical strength of the laminated body 100 and is formed into a sheet. Sheet shapes include not only a planar shape but also a cylindrical shape or a bag shape when viewed as a whole.

The base fabric 2 preferably includes fibers, and as the base fabric 2, a fabric, knit fabric, non-woven fabric, or the like can be used. The base fabric 2 may be partially or fully sewn. When the base fabric 2 is formed in a flat shape, the base fabric 2 can be used as a flat woven fabric, twill weave, satin weave, or the like. When the base fabric 2 is formed into a bag, the base fabric 2 can be used as an OPW (One Piece Woven) which is woven into a cylindrical or bag shape without stitching so that it can have a curved surface according to a shape of a product.

The fibers included in the base fabric 2 may be synthetic fibers, natural fibers, regenerated fibers, semi-synthetic fibers, inorganic fibers and combinations thereof, including mixed spinning and mixed woven. The fiber type may be used alone or two or more types of fibers may be used in combination. Among the fiber types, synthetic fiber is preferably used. The fibers may be composite fibers, such as core-sheath fibers, side-by-side fibers, or split fibers.

Suitable polymers constituting the synthetic fibers may include, for example, polyester, polyolefin, aramid, acrylic, vinylon, polyurethane; a copolymer in which an aliphatic dicarboxylic acid such as isophthalic acid, 5-sodium sulfoisophthalic acid, or adipic acid is copolymerized with an acid component constituting a polyester repeating unit; copolymer of nylon 6,6, nylon 6, nylon 12, nylon 4,6, and nylon 6 with nylon 66; polyamide in which polyalkylene glycol, dicarboxylic acid, amine, or the like is copolymerized with nylon; aramid represented by copolymerization with paraphenylene terephthalamide and aromatic ether; sulfone-based resin such as paraphenylene sulfone, polysulfone; rayon, ultra-high molecular weight polyethylene, and polyether ketone. The polymers may be used alone, or two or more types of polymers may be used in combination.

Suitable polyester may include, for example, polyalkylene terephthalate such as polyethylene terephthalate (PET), polytrimethylene terephthalate (PTT), polybutylene terephthalate (PBT), polyethylene naphthalate (PEN); and polyalkylene naphthalate such as polybutylene naphthalate (PBN). The polyester may be used alone or two or more types of polyesters may be used in combination.

In particular, when the adhesive layer 10 constituting the multilayer film 1 includes a polyester-based elastomer, the base fabric 2 preferably includes fibers made of polyester (polyester fibers) or fibers containing polyester. The base fabric 2 may include polyester fibers mixed with other fibers by mixed weaving or the like, mixed spinning fibers of polyester and non-polyester materials, or composite fibers of polyester and non-polyester materials, such as core sheaths fiber, side by side fiber, split fibers, or the like. When the adhesive layer 10 includes a polyester-based elastomer, the laminated body 100 can have even better durability because the base fabric 2 contains polyester, thereby improving the adhesion between the multilayer film 1 and the base fabric 2. The laminated body 100 can also be produced with relatively low cost while ensuring mechanical strength and weather resistance. Furthermore, when the base fabric 2 is made of polyester fibers, the above-described effects are more evident.

The base fabric 2 may use different types of fibers as fibers used for threads extending in different directions if the base fabric 2 has a structure that includes threads extending in a plurality of different directions.

The threads included in the base fabric 2 may be monofilaments or multifilaments. When the thread is a multifilament, a total fineness of the thread (single fineness×number of combined threads) is preferably 100 dtex-700 dtex. In addition, the single fineness of the fibers used in the base fabric 2 is preferably 1 dtex-10 dtex. In addition, when the base fabric 2 is a woven fabric, it is preferable that the woven density be 5 pieces/cm-30 pieces/cm for each of warp thread and weft thread.

A basis weight (mass per 1 m²) of the base fabric 2 is preferably 30 g/m²-300 g/m², more preferably 50 g/m²-200 g/m², further preferably 70 g/m²-150 g/m², and even more preferably 80 g/m²-100 g/m² or less in order to ensure the mechanical strength of the laminated body 100 as well as to improve storability and reduce cost of the laminated body 100.

The base fabric 2 may be closely woven. In this case, the laminated body 100 may be stronger. The base fabric 2 may also have an opening. If the base fabric 2 has an opening, the laminated body 100 can be lighter. In the laminated body 100, a preformed multilayer film 1 is laminated on the base fabric 2. Therefore, even though the base fabric 2 has an opening, the laminated body 100 can have sufficient mechanical strength and airtightness without any inconvenience, such as a polymer composition having a relatively low viscosity escaping from the opening.

(Method of Manufacturing Laminated Body)

Figure 8:
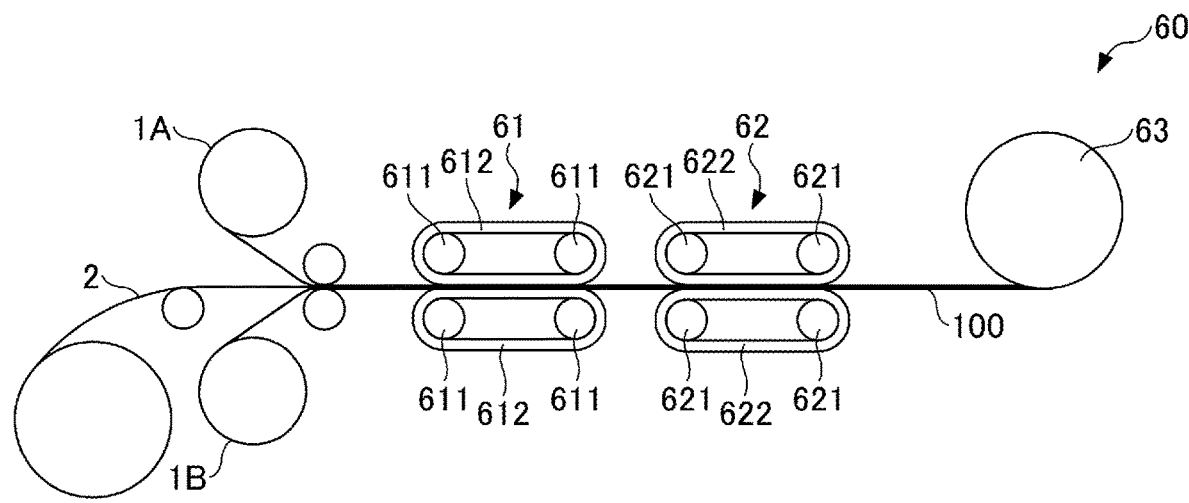
FIG. 8 is a diagram illustrating an example of a laminated body manufacturing apparatus.

An example of a method of manufacturing the laminated body 100 will be described. FIG. 8 is a schematic diagram showing an example of a laminated body manufacturing apparatus applied to the method of manufacturing laminated body. As shown in FIG. 8, the laminated body manufacturing apparatus 60 includes a heating and pressurizing section 61 and a cooling section 62.

The heating and pressurizing section 61 includes, for example, a pair of opposing rolls 611 (such as a nip roll), a pair of opposing belts 612, and a heating section (not shown). At least one of the pair of rolls 611 or the belt 612 may be heated by the heating section, not shown.

The heating temperature can be suitably designed according to the melting points of the adhesive layer 10, the intermediate layer 21, and the airtight layer 22. If the melting point of the adhesive layer 10 is lower than the melting point of the intermediate layer 21 and the airtight layer 22, the heating temperature is preferably a temperature below the melting point of the intermediate layer 21 and the airtight layer 22, and the temperature at which the adhesive layer 10 softens or melts. The function of the intermediate layer 21 and the airtight layer 22 can be ensured more reliably by setting the heating temperature to be below the melting point of the intermediate layer 21 and the airtight layer 22. In addition, the intermediate layer 21 and the airtight layer 22 may not be melted, and the adhesive layer 10 can be softened or melted. The heating temperature may be such that the intermediate layer 21 and the airtight layer 22 do not lose their airtight function due to an influence of heat.

The heating temperature depends on the melting points of the adhesive layer 10, the intermediate layer 21, and the airtight layer 22, and is, for example, preferably 100° C.-250° C. and more preferably 120° C.-200° C.

The pressurizing pressure may be suitably designed depending on the layered structure of the laminated body 100, thicknesses of the adhesive layer 10, the intermediate layer 21, and the airtight layer 22, and the like. The pressurizing pressure is, for example, preferably 5 N/cm²-700 N/cm², more preferably 10 N/cm²-500 N/cm², and even more preferably 15 N/cm²-50 N/cm².

The cooling section 62 can lower the temperature of the laminated body 100, preferably to the room temperature. The cooling section 62 includes a pair of opposing rolls 621 (such as a nip roll), a pair of opposing belts 622, a cooler (not shown) including a cooling medium, and an illustrated intake section. The cooler (not shown) can cool at least one of the pair of rolls 621 or the belt 622.

In the laminated body manufacturing apparatus 60, the base fabric 2 and the multilayer films 1A and 1B that had been wound on the roll 611 or the like are unwound, and the multilayer films 1A and 1B are laminated on both sides (top and bottom) of the base fabric 2, respectively. The laminated multilayer film 1A, the base fabric 2, and the multilayer film 1B are fed to the heating and pressurizing section 61, and the multilayer films 1A and 1B are pressed while being heated in the heating and pressurizing section 61.

The heating and pressurizing section 61 can heat at least one of the pair of rolls 611 or the belt 612, and allow passage of the laminated multilayer film 1A, the base fabric 2, and the multilayer film 1B between the pair of belts 612, and thereby perform heating and pressurizing.

The heating temperature is preferably, for example, a temperature at which the adhesive layer 10 softens or melts and at which the intermediate layer 21 and the airtight layer 22 do not melt. Thus, the adhesive layer 10 can be pressed against the base fabric 2 in a state in which the adhesive layer 10 is sufficiently softened or melted while maintaining the function of the intermediate layer 21 and the airtight layer 22. Then, the softened or melted adhesive layer 10 can also enter recessed portions of the irregularities on the surface of the base fabric 2, and the adhesive layer 10 can adhere closely to the base fabric 2. Thus, the multilayer films 1A and 1B can be bonded to the base fabric 2, respectively, and a laminated body 100 provided with the multilayer film 1A, the base fabric 2, and the multilayer film 1B is formed and conveyed.

The laminated body 100 which has passed through the heating and pressurizing section 61 is conveyed to the cooling section 62.

In the cooling section 62, cooling and pressurizing can be performed by cooling at least one of the pair of rolls 621 or the belt 622 and passing the laminated body 100 between the pair of belts 622. Preferably, the temperature of the laminated body 100 is lowered to the room temperature. The cooling unit 62 does not need to pressurize the laminated body 100 using the pair of opposing belts 622.

The laminated body 100 passing through the cooling section 62 is wound onto the roll 63.

Since the laminated body 100 is provided with the multilayer film 1, an occurrence of misalignment or distortion between the multilayer film 1 and the base fabric 2 is suppressed, and the multilayer film 1 can be stably bonded to the base fabric 2. Thus, an occurrence of interlayer exfoliation or the like between the multilayer film 1 and the base fabric 2 is suppressed, and the laminated body 100 has excellent durability.

The laminated body 100 can be bonded to the base fabric 2 by performing at least one of heating or pressurizing for the multilayer film 1 in the heating and pressurizing section 61. Thus, the durability of the laminated body 100 can be enhanced because the adhesive layer 10 can be bonded to the base fabric 2 while being impregnated in the base fabric 2.

Since the laminated body 100 can have excellent formability even when the multilayer film 1 is bonded to the base fabric 2, the laminated body 100 can be suitably used as the base fabric 2, for example, for an OPW woven without stitching in a cylindrical shape or a shape of a bag.

Figure 9:
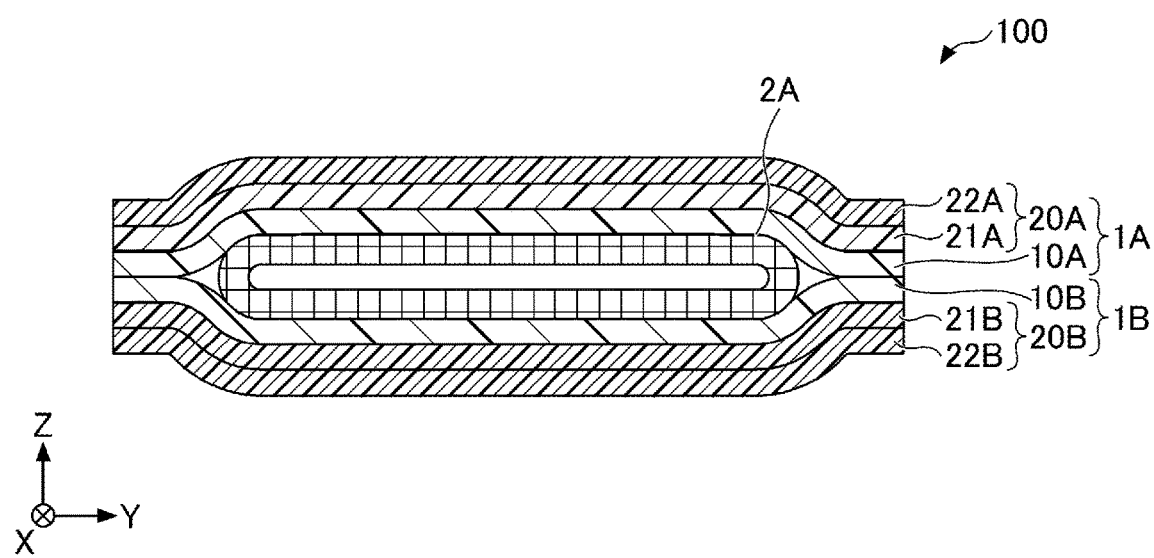
FIG. 9 is a cross-sectional view illustrating an example when a base fabric is an OPW.

FIG. 9 is a cross-sectional view showing an example in the case where the base fabric is an OPW. As shown in FIG. 9, the laminated body 100 is provided with the multilayer films 1A and 1B; and an OPW 2A, which contains air in an interior space and bulges in a shape of a bag; with the multilayer film 1 on the upper and lower surfaces of the OPW 2A. The edges of the multilayer films 1A and 1B are bonded to each other by heating and pressurizing.

When the laminated body 100 with the OPW 2A is manufactured using the laminated body manufacturing apparatus 60 shown in FIG. 8, the OPW 2A is wound around a roll or the like in a pre-deflated state and in a flat shape. The laminated body 100 is pressurized from both sides by the pair of rolls 621 in the heating and pressurizing section 61. Thus, the multilayer films 1A and 1B are bonded to the top and bottom surfaces of the OPW 2A, respectively, and the edges of the multilayer films 1A and 1B are bonded to each other by heating and pressurizing. Thus, the laminated body 100 shown in FIG. 9 is obtained. The obtained laminated body 100 can be expanded in a shape of a bag by air in the interior space of the OPW 2A.

Note that adhesive layers 10A and 10B may be bonded to cover the entire edge of the OPW 2A. Additionally, the extra edges of the laminated body 100 can be removed by cutting or the like. Accordingly, the multilayer film 1 can be formed on the entire surface of the OPW 2A formed in a shape of a bag.

The obtained laminated body 100 can be suitably used for a vehicle air bag, an outdoor product, a packaging application, and the like, since it is possible to stably maintain the state in which the multilayer film 1 is bonded to the surface of the OPW 2A which can be used in an inflated state where air is stored inside. The laminated body 100 can be particularly suited for use in a vehicular airbag, especially a curtain airbag. The curtain air bag is mounted on a roof line, or the like at the top of the vehicle side window and stored in a casing, or the like in a folded or rounded state. When a high load is applied, such as upon a collision, the curtain air bag expands into a bag-like shape and extends vertically downward along the side window in a shape of a curtain. Thus, the OPW used in the curtain air bag tends to have complex curved surfaces with multiple chambers formed and to have a structure with irregularities when inflated. The laminated body 100 is provided with the multilayer film 1 according to the present embodiment, so that it is possible to maintain the state in which the multilayer film 1 is well bonded to the OPW 2A, which forms a curved surface when inflated in a shape of a bag and generates irregularities on the surface. Therefore, in the laminated body 100, it is possible to suppress interlayer exfoliation between the multilayer film 1 and the OPW 2A, and breakage and the like, and the laminated body 100 has excellent durability.

(Variation)

In this embodiment, at least one of the adhesive layer 10, the intermediate layer 21, and the airtight layer 22 may be formed by two or more layers. For example, the multilayer film 1 may include a plurality of layers (e.g., two layers) in the adhesive layer 10 and the intermediate layer 21, respectively, and one layer in the airtight layer 22.

In this embodiment, the second layer 20 may be formed of the intermediate layer 21 or the airtight layer 22.

Figure 10:
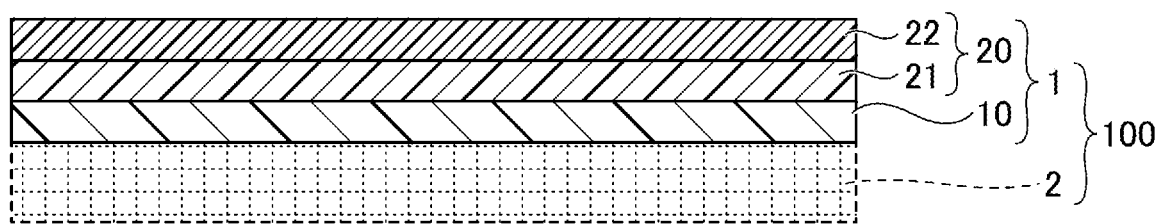
FIG. 10 is a cross-sectional view schematically illustrating another example of the multilayer film.
Figure 10:
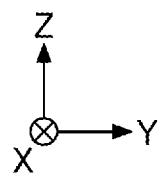

In this embodiment, in the laminated body 100, the multilayer film 1 may be laminated only on one side of the base fabric 2. For example, as shown in FIG. 10, in the laminated body 100, the multilayer film 1 may be laminated only on the surface of the base fabric 2 (in the +Z-axis direction).

In this embodiment, the laminated body 100 may be manufactured by bonding the multilayer film 1 fed below the room temperature to the base fabric 2 while heating at the temperature below the melting point of the airtight layer 22 using a heating means. The laminated body 100 may also be manufactured, for example, by bonding a polymer heated and extruded into a film by an extruder to the base fabric 2. In addition, the laminated body 100 may be manufactured by bonding the multilayer film 1 and the base fabric 2 by pressurizing the multilayer film 1 and the base fabric 2 while heating at a temperature at which the airtight layer 22 does not melt.

EXAMPLE

Hereinafter, practical examples and comparative examples are shown and the embodiments will be described in further detail. However, the embodiments are not limited by these examples and comparative examples.

<Preparation of Raw Materials>

Raw materials that can be used for the layers (adhesive layer, intermediate layer, and airtight layer) forming the multilayer film were prepared. As the raw materials a single material and a mixture of a plurality of materials were prepared. The single material and the mixture are shown below.

(Single material)

Polyester thermoplastic elastomer (TPEE-1)

Polyester thermoplastic elastomer (TPEE-2)

Polyester thermoplastic elastomer (TPEE-3)

Polyester thermoplastic elastomer (TPEE-4): "Arnitel (trademark registered) PM650", by DSM Co., Ltd., with a melting point of 221° C.

Thermoplastic polyurethane-based elastomer (TPU): "Estane (trademark registered) 58277", by Lubrizol Corporation, with a melting point of 130° C.

Polyamide-based thermoplastic elastomer (PEBA): "PEBAX (trademark registered) 6333", by Arkema Corporation, with a melting point of 169° C.

Ethylene-vinyl acetate copolymer (EVA): "Evatane (trademark registered) 28-05"; Arkema Corporation, with a melting point of 72° C.

Ethylene-vinyl acetate copolymer (EVOH: Eval (trademark registered) F101B), by Kuraray Co., Ltd., with a melting point of 183° C.

Low-density polyethylene (LDPE): "LD 100.BW", by Exxon Mobil Corporation

Maleic acid modified polyethylene (PE-MAH): "AMPLIFY (trademark registered) TY1353"; by Dow Chemical Company, with a melting point of 124° C.

(Mixtures)

Mixture 1: Mixture of TPEE-2 (80 wt %) and EVA (20 wt %)

Mixture 2: Mixture of TPEE-2 (70 wt %) and EVA (30 wt %)

Mixture 3: Mixture of TPEE-2 (60 wt %) and EVA (40 wt %)

Mixture 4: Mixture of TPEE-3 (70 wt %) and EVA (30 wt %)

TPEE-1, TPEE-2, and TPEE-3 were prepared as follows, respectively. The melting points of the prepared raw materials are melting peak temperatures measured by a differential scanning calorimeter (DSC).

(TPEE-1)

TPEE-1, which is a polyester-polyether block copolymer, was prepared using polybutylene terephthalate (PBT) as a hard segment and polytetramethylene ether glycol (PTMG) as a soft segment. In the copolymer, the content of PET was 85 wt %, and the content of PTMG was 15 wt %. The melting point of the resulting polyester-polyether block copolymer was 210° C.

(TPEE-2)

TPEE-2, which is a polyester-polypropylene block copolymer, was prepared using PBT as a hard segment, polypropylene glycol (PPG) as a soft segment, and trimellitic acid as a branched component. The resulting TPEE-2 is a polyester-based thermoplastic elastomer having a branched structure. In the copolymer, the content of PBT was 49.5 wt %, the content of PPG was 50 wt %, and the content of trimellitic acid was 0.5 wt %. The melting point of the resulting polyester-polypropylene block copolymer was 210° C.

(TPEE-3)

TPEE-3, which is a polyester-polyether block copolymer, was prepared using PBT as a hard segment and PTMG as a soft segment. In the copolymer, the content of PBT was 55 wt %, and the content of PTMG was 45 wt %. The melting point of the resulting polyester-polyether block copolymer was 150° C.

<Measurement of Melt Strength>

The melt strengths of the prepared single materials and the mixtures were measured.

(Measurement of Melt Strength of Single Material)

After a pellet of the single material was prepared, the single material was heated to 230° C. and melted. Using a capillary rheometer (ROSAND RH7) by Malvern Panalytical Ltd., the molten material was extruded from the capillary (diameter: 1 mm, length: 10 mm, entry angle: 180°) at a constant speed of a piston descending speed of 8.8 mm/min. The extruded material in a molten state was taken up at a take-up speed gradually increasing from 5 m/min, and the melt strength was determined as the tension when the resin broke. The measurement results are shown in TABLE 1.

(Measurement of Melt Strength of a Mixture)

Pellets of the single materials constituting the mixture were melted and mixed to form a pellet of the mixture and then heated to 230° C. to melt. For the molten mixture the melt strength was measured in the same manner as for the single material. The measurement results are shown in TABLE 1.

TABLE 1

| | | Material 2 | Melt strength [mN] |
|---|---|---|---|
| Single material | TPEE-1 | | 5.6 |
| | TPEE-2 | | 20.8 |
| | TPEE-3 | | — |
| | TPEE-4 | | 18.0 |
| | TPU | | 0.7 |
| | PEBA | | 8.0 |
| | EVA | | 5.0 |
| | EVOH | | 39.5 |
| | LDPE | | 43.7 |
| | PE-MAH | | 18.2 |
| Mixture | Mixture 1 | TPEE-2 (80%) + EVA (20%) | 10.6 |
| | Mixture 2 | TPEE-2 (70%) + EVA (39%) | 8.9 |
| | Mixture 3 | TPEE-2 (60%) + EVA (40%) | 8.0 |
| | Mixture 4 | TPEE-3 (70%) + EVA (30%) | 2.5 |
| | Mixture 5 | TPEE-3 (80%) + EVA (20%) | 1.4 |
| | Mixture 6 | TPEE-3 (90%) + PE1 (10%) | 3.1 |
| | Mixture 7 | TPEE-2 (80%) + EVOH (20%) | 24.6 |

From TABLE 1, among TPEE-1 to TPEE-4, TPEE-2 and TPEE-4 were found to have melt strengths of 18 mN or more. In the case of the mixtures containing TPEE-2, when the contents of TPEE-2 were 60% or more, the melt strengths were greater than or equal to 8.0 mN. Thus, it was confirmed that when the polyester-based thermoplastic elastomer has a branched structure, such as TPEE-2, the polyester-based thermoplastic elastomer or a mixture containing the polyester-based thermoplastic elastomer can have a higher melt strength.

Example 1

[Preparation of Multilayer Film]

(Preparation of Multilayer Film by Inflation Method)

The prepared raw materials (TPEE-1, TPEE-2, and TPEE-3) were charged into an inflation extruder (VAREX II, by Windmoeller & Hoelscher Corporation) having five extruders (extruders 1 to 5), i.e., TPEE-1 was charged into the extruder 1, TPEE-2 was charged into the extruders 2 and 3, and TPEE-3 was charged into the extruders 4 and 5, respectively. Each raw material was melted at or above the melting point of the raw material, and a melt of each resin in the extruder was extruded into a mouthpiece (die) an annularly formed outlet (port) from the extruder. An extrusion amount of the melt of the resin was 10 g/m² for each extruder. The extruded melt was pulled up in a form of a cylindrical inflation film (bubble) to make a multilayer film having a laminated three-layer structure with an airtight layer of TPEE-1, an intermediate layer of TPEE-2, and an adhesive layer of TPEE-3.

(Preparation of Multilayer Film by T-Die Method)

As shown in FIG. 5, in the preparation of the multilayer film using a co-extruder (FILMIX II, by Windmoeller & Hoelscher Corporation), three prepared raw materials (TPEE-1, TPEE-2, and TPEE-3) were charged into three extruders, respectively. Each raw material was melted at or above the melting point of each raw material, and a melt of the resin in each extruder was fed to a die having three outlets (ports). The melt in a shape of film was extruded from the outlet of the T-die and laminated simultaneously, and cooled to produce a multilayer film, in which the adhesive layer, the intermediate layer, and the airtight layer were laminated in this order from the bottom to the top. A screw speed of each extruder was set so that a film-like melt having a desired thickness was extruded from the T-die in a conventional manner.

[Evaluation]

The multilayer film was evaluated by measuring the melt strength of the multilayer film, the stability of the bubble of the multilayer film when using the inflation method with the inflation molding apparatus, and the neck-in rate of the multilayer film when using the T-die method.

(Measurement of Melt Strength)

The multilayer film was melted and mixed to form a pellet in which each layer of the multilayer film was uniformly distributed, and then the pellet was heated to 230° C. to melt. The melt strength of the melt of the multilayer film was measured in the same manner as that of the single material.

(Stability of Bubble Using the Inflation Method)

A wrinkle of the multilayer film obtained using the inflation method was observed to assess the stability of the bubble when a melt bubble of each resin was pulled up and molded. If a wrinkle was not found in the multilayer film, the bubble stability was determined to be excellent (indicated as "A" in TABLE 2). If a wrinkle was found in the multilayer film but the wrinkle was not found to cause a problem for a product, the bubble stability was determined to be good (indicated as "B" in TABLE 2). If the multilayer film could not be formed, the bubble stability was determined to be poor (indicated as "C" in TABLE 2).

(Measurement of Neck-In Rate Using the T-Die Method)

When the melt of the multilayer film prepared in the same manner as that upon measuring the melt strength was extruded from the outlet of the T-die using the T-die method, the neck-in rate (unit of %) around the outlet was measured (See FIG. 6). The neck-in rate was defined as a percentage value of a sum of the two widths occurring at both ends of the outlet port divided by the width of the outlet port ((sum of neck-in width/width of outlet)×100). If the neck-in rate was 30% or less, a product was evaluated to be acceptable. If the neck-in rate exceeded 30%, the product was evaluated to have a problem or unable to form a multilayer film.

Example 2

Example 2 was the same as Example 1, except that the adhesive layer was changed from TPEE-3 to the mixture 4 in Example 1.

Example 3

Example 3 was the same as Example 1, except that the airtight layer was changed from TPEE-1 to TPEE-2, the intermediate layer was changed from TPEE-2 to the mixture 4, and the adhesive layer was changed from TPEE-3 to the mixture 4 in Example 1.

Example 4

Example 4 was the same as Example 1, except that the airtight layer was changed from TPEE-1 to TPEE-4, the intermediate layer was changed from TPEE-2 to the mixture 5, and the adhesive layer was changed from TPEE-3 to the mixture 6 in Example 1.

Example 5

Example 5 was the same as Example 1, except that the airtight layer was changed from TPEE-1 to PEBA, the intermediate layer was changed from TPEE-2 to PE-MAH, and the adhesive layer was changed from TPEE-3 to PE-MAH in Example 1.

Example 6

Example 6 was the same as Example 1, except that the airtight layer was changed from TPEE-1 to TPEE-4, and the adhesive layer was changed from TPEE-3 to TPEE-2 in Example 1.

Example 7

Example 7 was the same as Example 1, except that the airtight layer was changed from TPEE-1 to EVOH, the intermediate layer was changed from TPEE-2 to EVOH, and the adhesive layer was changed from TPEE-3 to the mixture 6 in Example 1.

Example 8

Example 8 was the same as Example 1, except that the airtight layer was changed from TPEE-1 to the mixture 7, the intermediate layer was changed from TPEE-2 to the mixture 7, and the adhesive layer was changed from TPEE-3 to the mixture 6 in Example 1.

Example 9

Example 9 was the same as Example 1, except that the airtight layer was changed from TPEE-1 to TPEE-2, the intermediate layer was changed from TPEE-2 to EVOH, and the adhesive layer was changed from TPEE-3 to EVOH in Example 1.

Comparative Example 1

Comparative example 1 was the same as Example 1, except that the airtight layer was changed from TPEE-1 to TPU, and the intermediate layer was changed from TPEE-2 to TPU in Example 1.

Comparative Example 2

Comparative example 2 was the same as Example 1, except that the intermediate layer was changed from TPEE-2 to TPU in Example 1.

TABLE 2 shows results of measurements for the melt strength of the multilayer film, the stability of the bubble shape when using the inflation method, and the neck-in rate when using the T-die method in Examples and Comparison examples, respectively.

TABLE 2

| | Airtight layer/ Intermediate layer/Adhesive layer | Melt strength [mN] | Stability of bubble using inflation method | Neck-in rate when using T-die method [%] |
|---|---|---|---|---|
| Ex. 1 | TPEE-1/TPEE-2/TPEE-3 | 8.0 | A | 30 |
| Ex. 2 | TPEE-1/TPEE-2/mixture 4 | 9.1 | A | 20 |
| Ex. 3 | TPEE-2/mixture 4/mixture 4 | 9.0 | A | 20 |
| Ex. 4 | TPEE-4/mixture 5/mixture 6 | 7.5 | A | 30 |
| Ex. 5 | PEBA/PE-MAH/PE-MAH | 14.8 | A | 15 |
| Ex. 6 | TPEE-4/TPEE-2/TPEE-2 | 19.9 | A | 10 |
| Ex. 7 | EVOH/EVOH/mixture 6 | 27.4 | A | 5 |
| Ex. 8 | Mixture 7/mixture 7/mixture 6 | 17.4 | A | 15 |
| Ex. 9 | TPEE-2/EVOH/EVOH | 33.3 | A | 5 |
| Comp. ex. 1 | TPU/TPU/TPEE-3 | 1.9 | C | 50 |
| Comp. ex. 2 | TPEE-1/TPU/TPEE-3 | 7.1 | B | 35 |

As shown in TABLE 2, in Examples 1 to 9, the melt strength was greater than or equal to 7.5 mN, the bubble stability was good when using the inflation method, and the neck-in rate was less than or equal to 30% when using the T-die method. On the other hand, in Comparative examples 1 and 2, the melt strength was less than or equal to 7.1 mN, the bubble stability was good or poor when using the inflation method, and the neck-in rate was greater than or equal to 35% when using the T-die method.

Accordingly, it has been confirmed that if a single material or a mixture of materials having a high melt strength is used for the adhesive layer or the intermediate layer, the melt strength of the multilayer film itself can be increased, and the multilayer film can have excellent molding stability.

As described above the embodiments have been explained. However, the embodiments are presented as examples and the invention is not limited by the embodiments. The embodiments may be implemented in various other forms, and various combinations, omissions, substitutions, modifications, and the like may be made without departing from the spirit of the invention. These embodiments and modifications thereof are included in the scope and gist of the invention and fall within the scope of the invention recited in claims and equivalents thereof.

The present application claims the priority based on Japanese Patent Application No. 2019-221659, filed Dec. 6, 2019, and the entire content of Japanese Patent Application No. 2019-221659 is incorporated herein by reference.

DESCRIPTION OF SYMBOLS

1 Multilayer film
10 Adhesive layer (First layer)
20 Second layer
21 Intermediate layer
22 Airtight layer
2 Base fabric
2A OPW
100 Laminated body

The invention claimed is:

1. A multilayer film bonded to a base fabric comprising:
a first layer bonded to the base fabric; and
a second layer disposed on the first layer, wherein
the first layer, the second layer, or both includes a thermoplastic elastomer,
the thermoplastic elastomer is at least one selected from the group consisting of a polyester-based elastomer, a polyurethane-based elastomer, and a polyamide-based elastomer,
the first layer, the second layer, or both includes a branched component,
the thermoplastic elastomer included in the first layer or the second layer has a branched structure, and
a melt strength of the multilayer film is greater than or equal to 7.5 mN.

2. The multilayer film according to claim 1, wherein the first layer, the second layer, or both has a melt strength of 7.5 mN or more.

3. The multilayer film according to claim 1, wherein a content of the branched component is from 0.1 wt % to 10 wt %.

4. The multilayer film according to claim 1, wherein the first layer, the second layer, or both includes an ethylene-vinyl alcohol-based copolymer.

5. The multilayer film according to claim 1, wherein the base fabric is a base fabric for an air bag.

6. The multilayer film according to claim 1, wherein the second layer includes an airtight layer.

7. The multilayer film according to claim 6, wherein the second layer includes an intermediate layer between the first layer and the airtight layer.

8. The multilayer film according to claim 7, wherein at least one of the first layer, the intermediate layer, and the airtight layer has a melt strength of 7.5 mN or more.

9. A laminated body comprising:
the laminated film according to claim 1; and
the base fabric.

10. An air bag comprising:
the laminated body according to claim 9.

* * * * *